(12) United States Patent
Mitri

(10) Patent No.: US 11,699,944 B2
(45) Date of Patent: Jul. 11, 2023

(54) MAGNETIC COUPLER

(71) Applicant: Darrell Schmidt Enterprises, Inc., Brenham, TX (US)

(72) Inventor: George N. Mitri, Brenham, TX (US)

(73) Assignee: Darrell Schmidt Enterprises, Inc., Brenham, TX (US)

( * ) Notice: Subject to any disclaimer, the term of this patent is extended or adjusted under 35 U.S.C. 154(b) by 0 days.

(21) Appl. No.: 17/708,566

(22) Filed: Mar. 30, 2022

(65) Prior Publication Data
US 2022/0224215 A1    Jul. 14, 2022

Related U.S. Application Data

(63) Continuation of application No. 17/066,820, filed on Oct. 9, 2020, now Pat. No. 11,296,588.

(60) Provisional application No. 62/915,465, filed on Oct. 15, 2019.

(51) Int. Cl.
| | |
|---|---|
| *H02K 49/10* | (2006.01) |
| *H02S 10/10* | (2014.01) |
| *H02S 10/20* | (2014.01) |
| *H02K 1/02* | (2006.01) |
| *H02P 15/00* | (2006.01) |

(52) U.S. Cl.
CPC ............. *H02K 49/108* (2013.01); *H02K 1/02* (2013.01); *H02P 15/00* (2013.01); *H02S 10/10* (2014.12); *H02S 10/20* (2014.12)

(58) Field of Classification Search
CPC ............................ H02K 49/106; H02K 49/108
See application file for complete search history.

(56) References Cited

U.S. PATENT DOCUMENTS

| | | | | |
|---|---|---|---|---|
| 5,490,020 A * | 2/1996 | Albrecht | ................ | G11B 15/50 |
| | | | | 464/169 |
| 7,791,235 B2 * | 9/2010 | Kern | ......................... | F02C 7/32 |
| | | | | 310/103 |
| 7,982,351 B2 * | 7/2011 | Atallah | .................. | H02K 16/02 |
| | | | | 310/181 |
| 8,968,042 B2 * | 3/2015 | Calverley | .............. | B63H 23/24 |
| | | | | 310/46 |
| 9,570,967 B2 * | 2/2017 | Kobayashi | ............. | H02K 16/02 |
| 10,014,738 B2 * | 7/2018 | Tojima | ..................... | H02K 1/17 |
| 11,296,588 B2 * | 4/2022 | Mitri | ....................... | H02S 10/10 |

(Continued)

*Primary Examiner* — Dang D Le
(74) *Attorney, Agent, or Firm* — Park, Vaughan, Fleming & Dowler LLP; Shane Nelson

(57) ABSTRACT

Apparatuses, systems, and methods of use for a magnetic coupling device is disclosed. The magnetic device may have a plurality of magnets to create a magnetic field to the devices enclosed within the device. The coupling device may have a housing that encloses and/or partially surrounds one or more rotatable shafts. The coupling device may couple an output shaft from a motor to an input shaft of a generator. The coupling device may have an electric coil that when energized may vary any applied magnetic field to the rotatable shafts. The magnetic device may have a first plurality of magnets positioned at a first radial position and a second plurality of magnets positioned at a second radial position, with the first magnets being rotatable and the second magnets being stationary. Multiple magnetic coupling devices may be coupled together in series to provide increased magnetic fields to the enclosed system.

15 Claims, 11 Drawing Sheets

(56) References Cited

U.S. PATENT DOCUMENTS

2012/0091848 A1* 4/2012 Sakai ................... H02K 1/2766
310/156.43
2013/0057100 A1* 3/2013 Fukushima ............ H02K 16/02
310/114

* cited by examiner

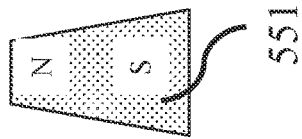
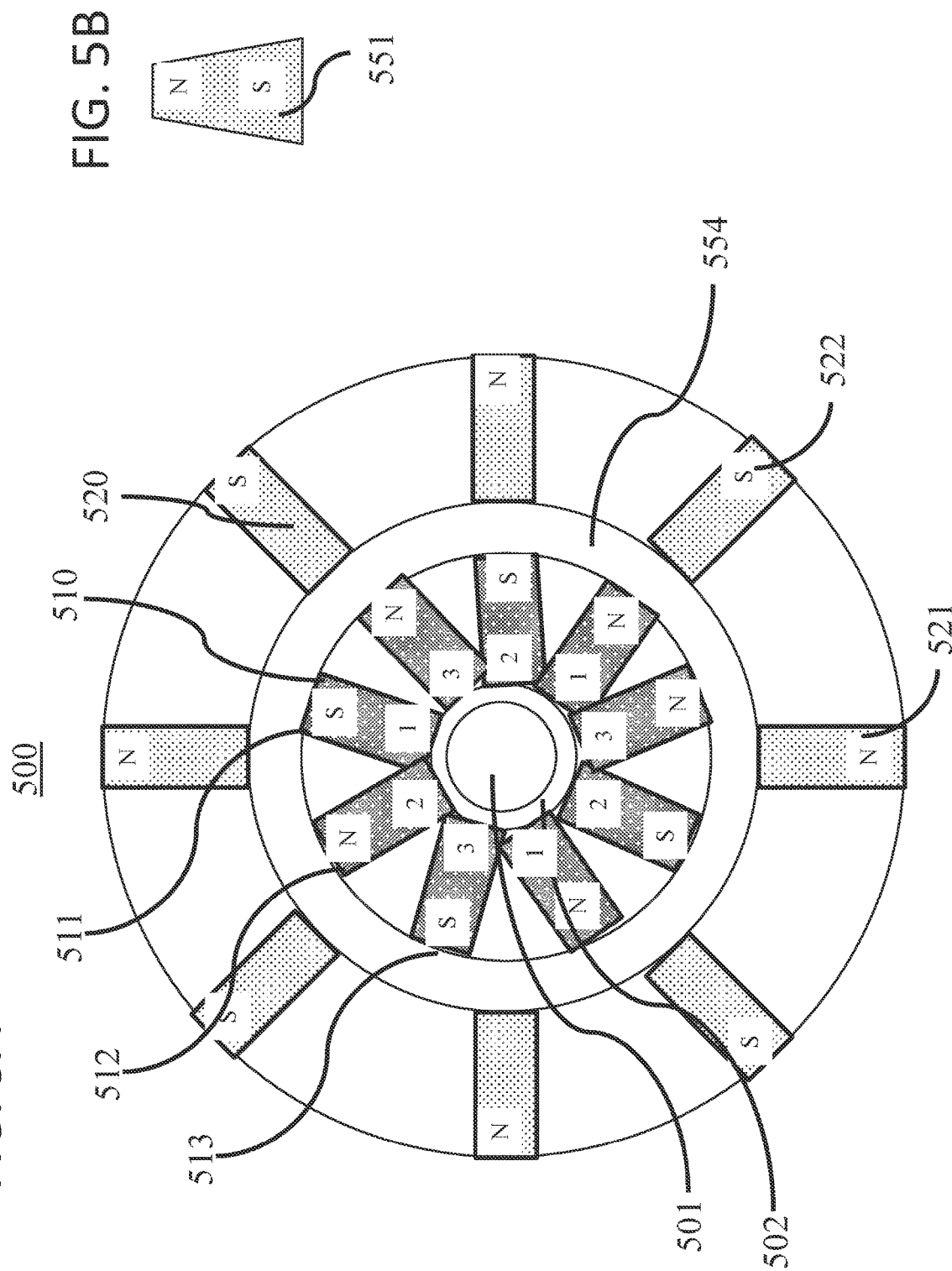

MAGNETIC COUPLER

The present application is a continuation of U.S. application Ser. No. 17/066,820, filed on Oct. 9, 2020, which claims priority to U.S. provisional patent application No. 62/915,465, filed on Oct. 15, 2019. The entire contents of each of the above documents is hereby incorporated herein by reference.

BACKGROUND OF THE INVENTION

Field of the Invention

This invention relates to magnetic couplers between a first device and a second device, and more particularly to a magnetic coupler that facilitates the transfer of torque, power, and/or rotation from a motor to an alternator or generator.

Description of the Related Art

Motors, alternators, and generators are well known in the art. So are devices that transfer energy, power, or rotation from a first device to a second device. In general, a coupler is a device that transmits force and/or motion between a first rotating part and a second rotating part. A mechanical coupler may be configured to allow for misalignment of shafts between a first device and a second device and to reduce vibrations, shocks, and overloads between a first device and a second device. Such mechanical couplers are well known in the art, and may include sleeve couplings, clamp couplings, beam couplings, disc coupling, fluid couplings, and gear couplings, as well as many other types of coupling devices.

Mechanical couplers can be used in a wide variety of applications. One particular application is for standalone electric power stations, and more particularly for coupling a motor shaft to an alternator (or generator) shaft. Such an embodiment is disclosed in U.S. Pat. No. 9,768,632 (the "'632 patent"), incorporated herein by reference. Looking at FIG. 1 of the '632 patent, an electric motor 125 engages and rotates an alternator 130, and in particular an output shaft of the electric motor is coupled to an input shaft of the alternator by mechanical coupling 127. As described in the '632 patent at col. 7, 1. 52-col. 8, 1. 9:

The coupling 127 between the alternator 130 and the motor 125 is a mechanical coupling 127 which converts the mechanical energy from the motor output into electrical energy output from the alternator 130. In the present invention the preferred coupling is capable of producing a mechanical to electrical energy transfer ratio of 1 to 1, hence there is lower energy loss as compared to other systems not using the preferred coupling. Therefore, the apparatus 100 of the present invention allows a high rate of electrical charge to the system. Normally, a coupling between a motor 125 and an alternator 130 introduces another power loss in the system due to the weight and torque needed to initiate turning and maintaining a proper speed based upon energy demand. Generally, industry standard couplings used between the motor and alternator are made from heavy dense material such as carbon steel to withstand cycling over the lifetime of the unit. As a result, additional energy is required to turn the coupling in addition to the motor and the alternator. Thus the coupling, motor and alternator, can cause energy loss. Another advantage of the preferred coupling 127 is its ability to cool the system while operating. The preferred coupling 127 of the present invention minimizes energy loss by using a high strength and light weight alloy. If a conventional steel coupling was employed it would require more energy from the system.

Conventional mechanical couplers cause energy loss during the transfer of energy between a motor and an alternator and are inefficient. Further, they do not increase, magnify, and/or otherwise enhance any energy/power transfer between the coupled devices.

An improved coupler is needed to efficiently transfer rotation from a motor to a second device, such as an alternator or generator. An improved coupler is needed that can enhance the transfer of energy and/or power between a first device and a second device. An improved coupler is needed that is more efficient, can run at slower speeds, and provides for increased torque.

SUMMARY

Apparatuses, systems, and methods of use for a magnetic coupling device is disclosed. The magnetic device may have a plurality of magnets to create a magnetic field to the devices enclosed within the device. The coupling device may have a housing that encloses and/or partially surrounds one or more rotatable shafts. The coupling device may couple an output shaft from a motor to an input shaft of a generator. The coupling device may have an electric coil that when energized may vary any applied magnetic field to the rotatable shafts. The magnetic device may have a first plurality of magnets positioned at a first radial position and a second plurality of magnets positioned at a second radial position, with the first magnets being rotatable and the second magnets being stationary. Multiple magnetic coupling devices may be coupled together in series to provide increased magnetic fields to the enclosed system.

Disclosed is a magnetic coupler device and system between two devices that comprises a plurality of permanent magnets. The permanent magnets may be positioned on (i) a rotor (e.g., the magnets may be coupled to one or more rotatable shafts within the magnetic coupling device, thereby rotating with the rotatable shafts) or on (ii) a rotor (rotating magnets) and a stator (permanent magnets) within the magnetic housing. The plurality of permanent magnets may comprise a first plurality of magnets that are stationary and a second plurality of magnets that are rotatable. The second plurality of magnets may at least partially surround the first plurality of magnets. In a first operation, a magnetic field is created based on a (small) induced current into one or more coils surrounding the rotor (with permanent magnets, creating magnetic field B1); the induced rotating magnetic field of the magnetic coupler increases the torque/power output from the magnetic coupler. In a second operation, a magnetic field is permanent presently based on the first plurality of permanent magnets within the rotor (B1 magnetic field) and the second plurality of permanent magnets (B2 magnetic field) within the housing/stator. The rotating inherent magnetic field of the magnetic coupler increases the torque/power output from the magnetic coupler.

Disclosed is a magnetic coupling device that comprises a first rotatable shaft coupled to a second rotatable shaft, a housing that is configured to surround the first and second rotatable shafts, and a first plurality of permanent magnets coupled to at least one of the first rotatable shaft and the second rotatable shaft within the housing. The first plurality of magnets may be coupled to both the first rotatable shaft and the second rotatable shaft. The first plurality of permanent magnets may be configured to create a rotating magnetic field within the housing. The device may include one or more induction coils within the housing configured to increase a magnetic field of the first plurality of permanent magnets when electrically charged. The magnetic coupling device may be configured to increase the RPM of the first rotatable shaft or the second rotatable shaft based on the first plurality of permanent magnets. The magnetic coupling device may be configured as an axial torque multiplying device.

The coupling device may comprise a direct mechanical coupling between the first shaft and the second shaft, such as a spider coupling. The first rotatable shaft may be an output shaft of a motor and the second rotatable shaft may be an input shaft to an alternator or generator. The first plurality of magnets may be coupled to the first or second rotatable shafts by a cylindrical ring, such as being located in a plurality of grooves within a cylindrical ring that is press fit onto the shafts. The permanent magnets may be arranged at various positions within the housing. In one embodiment, a first plurality of magnets is configured to rotate within the housing, while a second plurality of magnets is configured to remain stationary. The first plurality of magnets may be arranged concentrically around the first rotatable shaft and the second rotatable shaft at a first radial position. The plurality of magnets may be arranged concentrically around the first and second rotatable shafts in alternating strengths. The plurality of magnets may be neodymium magnets with at least two or three different strengths of magnets.

The plurality of magnets may comprise a first and second plurality of magnets. A second plurality of permanent magnets may at least partially surround the first plurality of permanent magnets. The second plurality of permanent magnets may be located within the housing and separated by the first plurality of permanent magnets by an air gap. The second plurality of permanent magnets may be located radially outward of the first plurality of magnets. The second plurality of magnets may be positioned concentrically within the housing at a second radial position and the first plurality of magnets may be positioned concentrically within the housing at a first radial position, wherein the second radial position is greater than the first radial position. The first plurality of magnets may be configured to rotate and the second plurality of magnets may be configured to remain substantially fixed. The first plurality of magnets may be configured to rotate relative to the second plurality of magnets. The housing may comprise a second plurality of magnets located on a first part of the housing and a second part of the housing, wherein the first part and second parts are configured to move in relation to the first plurality of magnets. The housing may comprise a first part and a second part, wherein a first actuator is coupled to the first part and a second actuator is coupled to the second part, wherein the magnetic field is configured to vary based upon actuation of the first or second actuators. The coupling device may further comprise a stepper motor to vary a magnetic field within the magnetic coupling device. The coupling device may further comprise a mechanical braking system configured to prevent rotation of the first rotatable shaft or the second rotatable shaft. The coupling device may comprise a rotor and a stator, wherein a magnetic flux of the magnetic coupling device comprises the sum of the induced magnetic field from the stator and the rotating magnetic field from the rotor.

Also disclosed is a magnetic housing that comprises a housing that is configured to substantially surround one or more rotatable shafts and a plurality of permanent magnets located within the housing and configured to create a rotating magnetic field around the one or more rotatable shafts. The one or more rotatable shafts comprises a first shaft and a second shaft, wherein the housing is configured to surround a mechanical coupling device that couples the first shaft to the second shaft. The plurality of permanent magnets may be coupled to the one or more rotatable shafts. The plurality of permanent magnets may be arranged concentrically around the one or more rotatable shafts. The plurality of permanent magnets is configured to rotate within the housing to provide an enhanced magnetic field. The plurality of permanent magnets may comprise a first plurality of magnets and a second plurality of magnets, wherein the second plurality of magnets at least partially surrounds the first plurality of magnets.

Also disclosed is a magnetic electrical power and production system that comprises a motor with a first shaft, a generator with a second shaft, wherein the first shaft is coupled to the second shaft, and a first magnetic housing at least partially surrounding the first shaft or the second shaft. The first magnetic housing has a plurality of permanent magnets concentrically positioned around the first shaft or the second shaft at a first radial position, and the first magnetic housing is configured to generate a rotating magnetic field based on the permanent magnets. The first shaft is coupled to the second shaft by a direct mechanical coupling within the first magnetic housing. The first magnetic housing is configured to increase the torque produced from the motor and/or the RPM of the first shaft. The plurality of permanent magnets may be configured to rotate with the first shaft or second shaft. The distance between the first magnetic housing and the first or second shaft may be variable. The distance between the first magnetic housing and the first or second shaft is configured to be dynamically controlled by at least one of the following: a stepper motor, a servo motor, or one or more actuators. The first magnetic housing comprises a first part and a second part, wherein the first part and the second part are moveable relative to the first shaft or second shaft. The first part may be coupled to a first actuator and the second part may be coupled to a second actuator. The strength of the magnetic field may be variable based on the relative positions of the first part and second part. The first magnetic housing may be configured to dynamically change the magnetic field based on movement relative of the magnetic housing relative to the first shaft or second shaft. The system may comprise a second magnetic housing coupled to the first magnetic housing in series, wherein the first magnetic housing applies a first magnetic field to the first shaft, and the second magnetic housing applies a second magnetic field to the second shaft. The first magnetic housing may be configured to couple the motor to the second magnetic housing, and the second magnetic housing is configured to couple the first magnetic housing to the alternator. The system may comprise a second magnetic coupling device coupled in series to the first magnetic coupling device, wherein the second magnetic coupling device comprises a second plurality of permanent magnets. The system may comprise a mechanical coupling that couples the first shaft to the second shaft, wherein the first magnetic housing at least partially surrounds the mechanical coupling. The first magnetic coupling device may increase the electrical power output for the system by a factor of at least two. The output power from the generator is greater than at least two times an input power to the motor, and may be greater than at least four times.

In one embodiment is disclosed a method of providing electrical energy, which comprises coupling an electric motor to a generator with a magnetic coupling device, wherein the magnetic coupling device comprises a plurality of permanent magnets, energizing the electric motor, and creating a rotating magnetic field by the magnetic coupling device. The method may further comprise providing electrical current to the magnetic coupling device to create a rotating magnetic field. The method may further comprise inducing power to the magnetic coupling device to create a rotating magnetic field. The method may further comprise rotating the plurality of magnets by applying current to the magnetic coupling device. The method may further comprise rotating the plurality of magnets by induction of a magnetic field. The method may further comprise varying a magnetic field in the magnetic coupling device by varying an electrical current provided to the magnetic coupling device. The method may further comprise varying a magnetic field in the magnetic coupling device by changing the relative positions of one of more portions of the magnetic housing relative to the permanent magnets. The method may further comprise creating a rotating magnetic field by relative movement of the first and second plurality of magnets. The method may further comprise inducing a magnetic field in the magnetic coupling device by rotating a first plurality of magnets within a second plurality of magnets within the magnetic coupling device. The method may further comprise providing an output power from the generator that is greater than the input power to the electric motor. The method may further comprise increasing an axial torque produced by the motor based on the magnetic field.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 5A illustrates a schematic of one embodiment of a magnetic coupling device according to the present disclosure.

FIG. 5B illustrates a cross-sectional view of one embodiment of a magnet used in a magnetic coupling device according to the present disclosure.

DETAILED DESCRIPTION

Figure 1:
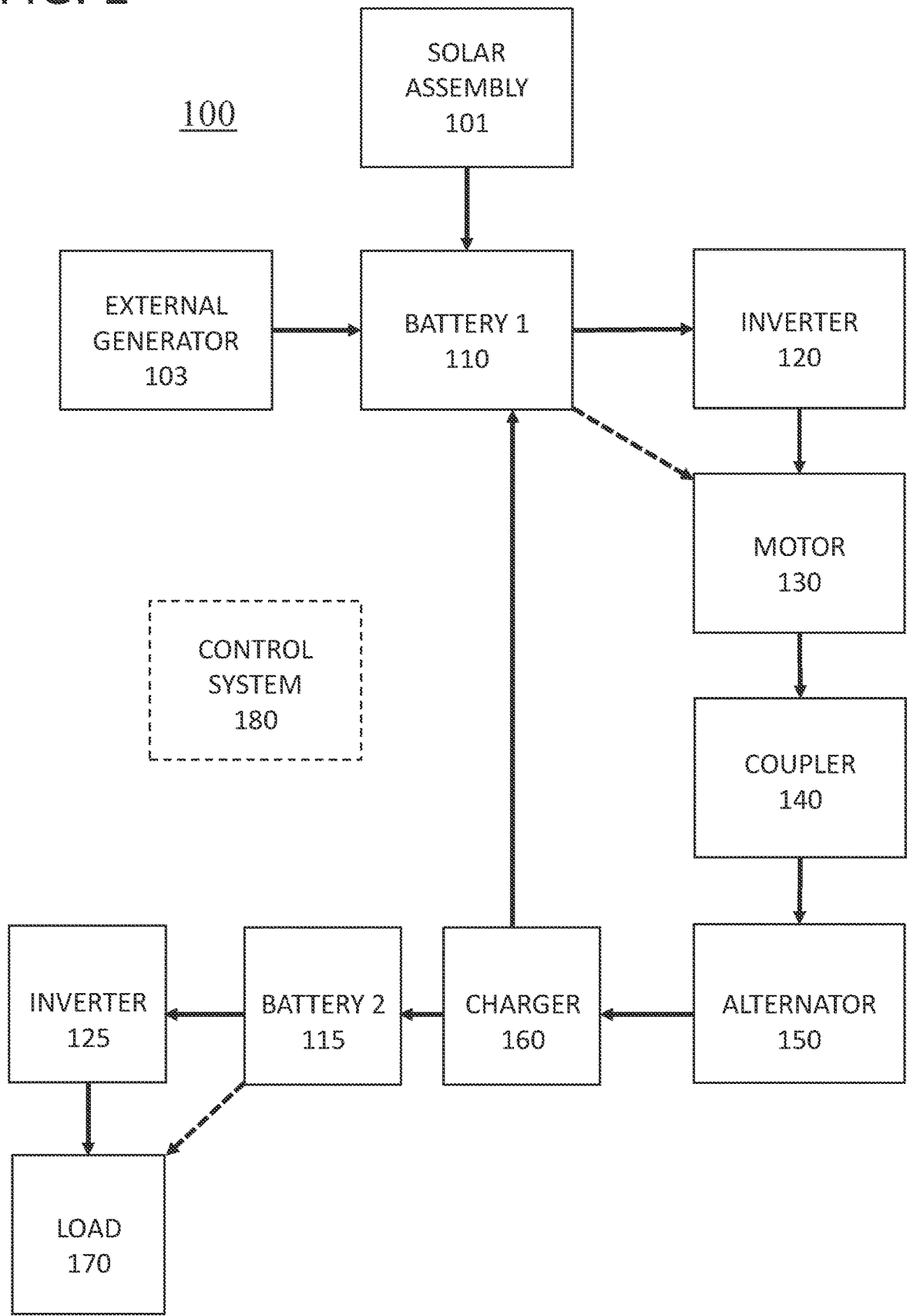
FIG. 1 illustrates an electrical flow diagram of one embodiment of an electrical power station of the present disclosure.

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Electric Power Station

In general, the disclosed electric power station ("EPS") uses one or more magnetic components as an integral part to the overall power production and/or distribution system. In one embodiment, the disclosed magnetic EPS may be similar to the EPS as described in U.S. Pat. No. 9,768,632 ("the '632 patent"), incorporated herein by reference, but utilizes one or more magnetic devices and/or components as an integral part to the EPS, which are not disclosed in the '632 patent. In one embodiment, any one or more of the components of the disclosed magnetic EPS (such as charging system, control system, power management system, etc.) may be substantially similar to the similarly described components in the '632 patent.

In general, the present application discloses a highly efficient regenerative hybrid power storage, generation, and management system. In one embodiment, it uses a combination of solar arrays and stored chemical potential energy (e.g., batteries) to drive one or more motors and/or electric alternators/generators. The system is a stand-alone system and may be scaled for industrial, commercial, or residential use. In one embodiment, a core concept of the EPS includes converting stored chemical energy to electrical energy, along with providing a method for storing, regenerating, and distributing this energy more efficiently, such as by using one or more magnetic devices as an integral component of the EPS. In one embodiment, the use and operation of the magnetic devices enhances the power, torque, efficiency, and/or other desired attributes/features of the EPS.

In one embodiment, electricity generated by the disclosed EPS may be utilized to directly service one or more electric loads, be transferred to the grid, and/or used to recharge the battery storage system of the EPS as needed. In one embodiment, the disclosed EPS is configured to power a wide range of devices that require electrical energy by using various mechanical and electrical principles of operation. In one embodiment, the disclosed EPS provides a regenerative energy storage and conversion apparatus and method to produce, store, and distribute electrical energy. In one embodiment, the disclosed EPS uses chemical energy to produce mechanical rotation and mechanical rotation to produce electrical energy. In one embodiment, the disclosed EPS generates and stores electrical energy as chemical potential energy in a plurality of batteries, to be transferred into mechanical energy on demand for the purpose of rotating an electrical generator to service a load and recharge the battery, and a method of production and distribution of the energy produced therefrom. In one embodiment, the disclosed EPS utilizes programmed computer control to monitor battery charge and direct energy flow for load servicing and distribution, including a regenerative system that senses or analyzes the need for energy to supply a load.

In one embodiment, the disclosed hybrid EPS both stores potential energy in batteries and generates electricity based upon demand. The load/demand may be consistently evaluated and distributed in real time by a system computer and controls. Thus, the EPS provides an energy source that may be utilized even when no electricity is available to recharge the batteries. For example, a solar cell array may be utilized as one source to charge the batteries, but solar cells only produce electrical energy when there is sufficient sunlight. Thus, the energy generated by the EPS may be engaged when sunlight is deficient or not available. In one embodiment, a backup power source (such as electricity from the grid, a solar array, a fuel fired generator, or other conventional means) may be employed as a backup system to maintain the charge of the batteries in the event that additional power is necessary that is not supplied by the solar array system. However, in a stand-alone or solitary configuration, the backup system could be limited to a solar array as one source providing independence from the electrical distribution grid.

In one embodiment, the disclosed EPS provides an environmentally sensitive electrical power station that may be scaled to service a plurality of loads, including but not limited to industrial, commercial or residential electrical demand with the ability to grow with increased electrical demands of the business or residence with minimal or no outside power source. The EPS uses electrical current (AC or DC) from a supply battery to power an electric motor (AC or DC) that in turn engages an alternator (AC or DC) to produce electrical power distributed to a plurality of load batteries to service a load (AC or DC) and use a portion of that generated electricity to recharge the supply batteries, and a method of production and distribution of the energy produced there from.

FIG. 1 illustrates one embodiment of an electric power station that may be used with a magnetic device/component. In one embodiment, this configuration is AC or DC based. In general, the EPS converts stored chemical energy (such as from a battery) into mechanical motive energy to cause rotation of an alternator to produce electricity. The disclosed EPS may comprise first battery bank 110, first inverter 120, second inverter 125, motor 130, coupler 140, alternator 150, charger 160, and second battery bank 115. Further, the EPS may comprise or be coupled to load 170. In some embodiments, solar assembly 101 may be coupled to a portion of the system, such as first battery bank 110. In some embodiments, external generator 103 is an external power supply source and may be used as a backup power source to the system and be coupled to a portion of the system, such as first battery bank 110, which may be useful if the solar array system is down or if there are long periods without power supplied from the solar array or during initial charging of the first battery system 110. The EPS may also comprise control system 180, which is electrically coupled to some or all of the components of the EPS. The control system may include a plurality of sensors, program logic controllers (PLC), one or more displays, and various other electrical components as is known in the art, and as more fully described in the '632 patent, incorporated herein by reference. For example, if pneumatic or hydraulic fluids is used as part of the EPS, the control system may include various sensors, control loops, and actuators necessary for these extra components/features.

As described in more detail, any one or more of these components may be coupled with a magnet, magnetic device, and/or magnetic system to enhance one or more desired attributes of the EPS. For example, any one of the motor, coupler, and/or alternator (or generator) may be a magnetically enhanced device as described herein. In some embodiments, the motor, coupler, and/or alternator (or generator) may be coupled to a magnetic apparatus for enhancing various operations. As is known in the art, the EPS may be AC or DC based, a dynamo may be substituted for the alternator, and the EPS may or may not use an inverter. More or less components may be used based on the particular arrangements of the system. In one embodiment, the overall size and configuration of the system is designed for a particular load and particular application.

In one embodiment, solar assembly 101 provides power to EPS 100. The solar assembly may be an off the shelf unit appropriately sized for the EPS unit. The solar assembly may include one or more solar panels (e.g., a solar array), one or more combiner panels, and one or more charge controllers, as well as other solar assembly components as is known in the art. In one embodiment, the solar array is separate from the EPS and merely provides power to the EPS, while in other embodiments the solar array is considered an integral component of the EPS. In one embodiment, the solar array provides sufficient electrical energy to the battery systems of the EPS to maintain sufficient energy storage in the batteries to optimize functioning of the electricity production circuit(s) within the EPS. In other words, the solar array is able to charge the battery system to a minimum level to keep the EPS operating at a given power output. Solar array 101 may be any conventional solar panel system and/or array (along with an inverter and any necessary circuitry as is known in the art). Solar array 101 converts sunlight to electrical energy by the use of one or more solar cells. In use, the electricity generated from the solar cells maintains sufficient electrical charge in the batteries to energize the electric energy transfer and electricity production circuit within the EPS to produce electricity for distribution. While EPS 100 may run for short or long periods of time without recharge by the solar array system, at some point if the solar array does not generate sufficient electricity (such as due to weather conditions), another means of generating sufficient electricity may be needed to maintain the charge in the battery systems to energize the electric motor. In one embodiment, a gas or liquid fueled electricity generator 103 (which is known in the art), or even electrical energy from the grid, may be utilized to maintain the electric system energy input of the EPS at required levels and/or to recharge the battery system.

In one embodiment, EPS 100 comprises first battery system 110 and second battery system 115. In one embodiment, first battery system 110 is configured to supply electrical energy to the motor (and inverter if appropriate) and is a control battery system for the EPS, while second battery system 115 is configured to supply electrical energy to one or more loads (and inverter if appropriate). In one embodiment, first battery system 110 functions as and may be referred to as the source or power batteries, and second battery system 115 functions as and may be referred to as the load batteries. The source or power batteries are the power source for the prime mover (the motor) of the EPS. In other embodiments, only a single battery system is used. For example, a battery system may be used to power the EPS while the alternator directly powers one or more loads. Each battery system may comprise a plurality of batteries connected in series or in parallel and may be considered as a group or "bank" of batteries. The number of individual batteries in each battery bank is dependent upon the load the system is designed to service, and a particular battery unit output is designed for the specific load requirements of the EPS. In one embodiment, each battery within a battery bank or battery system is charged to capacity in unison until all of the battery units are optimally charged. In one embodiment, a first battery bank system is charged at a first charging rate while a second battery bank system is charged at a second charging rate. In other embodiments, a first battery bank system is charged while a second battery bank is discharged. Such battery systems increase the electrical energy storage capacity of the EPS by chemical energy storage, thereby enabling any unused electrical energy as potential energy in reserve. The battery systems are coupled to a control system of the EPS and/or a battery management system.

In one embodiment, the batteries may be any type of rechargeable batteries such as lead-acid, nickel-cadmium (NiCd), nickel-zinc (NiZn), nickel metal hydride (NiMh), lithium-ion (Li-ion), and others, and may have wet cell or dry cell batteries. In general, the disclosed EPS and present embodiments are not limited by any particular type of battery system, and may be any off the shelf rechargeable battery. In other embodiments, the battery system may utilize supercapacitors instead of a traditional rechargeable battery. As is known in the art, supercapacitors, such as supercaps or ultracaps, are high-capacity capacitors with a capacitance value much higher than traditional batteries, can accept and deliver charge much faster than batteries, and can handle many more charging/discharging cycles than rechargeable batteries. In comparison to a traditional battery, supercapacitors charge and discharge quicker and can provide more power.

In one embodiment, two separate battery systems may be desired for the power supply and load, as they will see different charging and discharging rates and it is generally desirable to keep the battery systems separate for better power management and control of the EPS. For example, as soon as a battery is charged/discharged, there is an increase in heat for the battery system; separating different battery systems for the different charging/discharging or power supply/load requirements helps manage heat for the EPS and batteries themselves. A separate battery system also allows a charging rate of one battery system at a greater rate than a discharging rate of the other battery system, as more fully described herein and in the '632 patent. Another benefit of separating the power supplies is related to battery management. In one embodiment, the power batteries have a threshold charge under which the EPS system will shut down or start disconnecting loads. For example, normal operating ranges for the power supply may be in the order of 90-100%. If the charge of the power batteries is less than 90%, the EPS system is configured (via a control system) to reduce the discharge rate from the power supplies. This is important because in one embodiment, if the supply batteries fall below a predetermined threshold, under normal operations of power output and power input (from the solar array) the battery system can never fully recharge and there may be a slow downward cycle for the supply batteries. Eventually, once the supply batteries are down/fully discharged, the EPS system is down and cannot operate until the supply batteries are charged to a sufficient power level. On the other hand, the load batteries can be depleted more than the supply batteries. If the load batteries are down (or fall below any predetermined thresholds), the EPS can still function normally as long as the supply batteries are sufficiently charged. In one embodiment, the load batteries can drop down to 75%, 50%, or even 25% or less and the EPS unit can still work properly and still service the loads. Of course, depending on the connected loads, the power draws and duration of those loads, the EPS is designed to shut the power down to any one or more connected loads to maintain power in the load batteries or the supply batteries.

In one embodiment, supply battery system 110 is a different type of battery system than load battery system 115. In one embodiment, the source/supply batteries are slowly charged from the solar array, slowly discharged to the motor, and slowly charged from the EPS unit; in contrast, the load batteries may be quickly charged or discharged depending on the loads and the power provided from the EPS. In other words, the charging and discharging rates and capacities from the supply batteries and load batteries are different, and in one embodiment, the batteries are selected and/or configured based on these different charging capabilities. In one embodiment, the load battery is a battery configured for high charging and discharging rates, and the source/power batteries are configured for slow charging and discharging rates. In one embodiment, the load batteries may be a non-traditional battery source, such as a supercapacitor, which allows bursts of energy as needed for high load requirements.

In one embodiment, first battery system 110 is electrically coupled to an electrical conversion apparatus 120, such as an inverter, that converts DC current from the batteries to AC current for AC motor 130. In other embodiments, such as when the motor is a DC motor, an inverter may not be necessary, and power is routed directly from supply battery 110 to DC motor 130. An inverter is well known in the art, and generally is an electronic device that changes direct current (DC) to alternating current (AC), or vice versa. The input voltage, output voltage, and frequency, as well as overall power handling capabilities, depend in part on the inverter. The power inverter may be entirely electronic or may be a combination of mechanical effects (such as a rotary apparatus) and electronic circuitry. In general, there are two types of inverters—high output low frequency (HOLF) inverters and low output high frequency (LOHF) inverters. Both types are capable of operating at different frequencies, such as 50 and 60 Hz frequencies. Inverters may convert energy from DC to AC or AC to DC, and may convert the electrical energy to a wide range of frequencies. In one embodiment, inverter 120 converts 360 volt DC to three-phrase 380 volt AC. In other embodiments, the inverter converts 200 to 450 volt DC to three phase AC. In one embodiment, the inverter is a 3 phase inverter, may use a modified wave form, and/or may be a variable frequency drive (VFD) inverter that controls AC motor speed and torque by varying the motor input frequency and voltage.

Inverter 120 may be electrically coupled to motor 130, which may be coupled to alternator 150 by coupler 140. In one embodiment, motor 130 is a conventional electric motor with an output shaft, and alternator 150 is a conventional alternator with an input shaft. As is known in the art, a motor is an electrical device that converts electrical energy into mechanical energy, and generally reverse to a motor, a generator (such as an alternator or DC generator/dynamo) is an electrical device that converts mechanical energy into electrical energy. Coupler 140 may be a mechanical coupling (such as a spider coupling) that transfers the mechanical energy from the motor to the alternator. The mechanical coupling may be a conventional coupling as is known in the art or a high efficiency, high strength, light weight alloy or polymer based coupling system. In other embodiments, any one of the motor, coupler, or alternator may comprise or be coupled to a permanent magnetic device or system, as detailed further herein. As is known in the art, the motor and alternator are sized/configured to produce a certain amount or torque, power, or RPM. The motor and alternator are sized appropriately based on the load requirements of the EPS and the intended use/application. In one embodiment, the coupler is an assisting component of the EPS, and is used in the transfer of rotation/torque between the motor to the alternator. In one embodiment, each of the motor, inverter, and alternator is 3 phase, which is configured to produce 3 phase AC by the EPS, while in other embodiments the system is configured to produce single phase AC power. In one embodiment, the motor is the "prime mover" of the EPS system and not the "alternator" or the "coupler," while in other embodiments the collection of the motor, coupler, and alternator may be considered as the "prime mover" for the EPS. Inverter 125 may be substantially similar to inverter 120. Inverter 125 is illustrated in FIG. 1 as connecting battery system 115 to load 170, which assumes that load 170 is an AC based load. In the event that load 170 is a DC based load, inverter 125 may not be needed and power may flow directly from battery system 115 to load 170.

In one embodiment, motor 130 is an electric motor or device that converts electrical energy into mechanical energy. Motor 130 may be a DC motor or an AC motor. As is known in the art, a DC motor may receive power from a DC battery source without an inverter, while an AC motor requires an inverter to utilize power from a DC battery source. In one embodiment, the motor is a 3 phase asynchronous induction motor, while in other embodiments it is a brushless DC motor. Electric motor 130 may produce linear force or rotary force. In one embodiment, the electric motor uses a magnetic field and winding currents to generate force. As is known in the art, the electric motor may have a rotor and a stator. The rotor is the moving part of the motor that generally turns the shaft of the motor to produce mechanical power. The rotor may have permanent magnets or have conductors/windings that carry current. The stator is the stationary part of the motor and usually consists of either coiled windings or permanent magnets. The motor may be synchronous or asynchronous, and DC or AC based. If the motor is a brushless DC motor, then no inverter is necessary between the battery system and the motor. In one embodiment, the motor is sized based on the size of the EPS system, and in particular the targeted output horsepower, torque, or load of the EPS. In one embodiment, a brushed DC motor has an average efficiency value between 70-85%.

In one embodiment, the alternator is an electrical generator that converts mechanical energy to electrical energy in the form of alternating current. A generator, for the purposes of this disclosure, may include an alternator (which produces AC power) or a DC generator/dynamo (which produces DC power). Thus, while one may loosely consider the described alternator as a generator (which is generally known as a device that converts motive power into electrical power for use in an external circuit), the overall EPS system itself should more properly be considered as a generator (which includes both a motor and an alternator/generator). Conventional alternators have a rotor and a stator, and a rotating magnetic field in the rotor causes an induced AC voltage in the stator windings. In general, there are two primary ways to produce a magnetic field in an alternator. First, permanent magnets may be used which create their own persistent magnetic fields—these types of alternators may be called magnetos. Second, wound electric coils may be used to form an electromagnet to produce the rotating magnetic field. In some embodiments, a dynamo (DC based) is used instead of an alternator (AC based); as is known in the art, a DC based alternator is generally known as a dynamo, and an AC based alternator is simply an alternator. The benefits of the disclosed EPS does not depend on whether an alternator is DC based or AC based, or whether an alternator is used instead of a dynamo (which is generally considered to be an "alternator" as described herein). In one embodiment, the alternator is a 3 phase alternator, and may be a 3 phase permanent magnet alternator or generator (PMG/PMA).

Alternator 150 may be electrically coupled to charger/charging system 160 and/or load 170. Charger 160 is electrically coupled to one or more of the battery banks. For example, FIG. 1 illustrates charger 160 being electrically coupled to first battery system 110 and second battery system 115. EPS 100 is configured to not only charge the battery systems but to also provide electric energy to one or more loads. In some embodiments, the batteries are charged without supplying electrical energy to the loads, while in other embodiments electrical energy is provided to the load without electrical energy being provided to the batteries. In another embodiment, first battery system 110 is being charged while second battery system 115 is being discharged, while in another embodiment first battery system 110 is being charged while second battery system 115 is not being charged or discharged. In some embodiments, as more fully described in U.S. Pat. No. 9,768,632, incorporated herein by reference, the charger is configured to generate a rate of charge to one battery bank faster (such as battery bank 110) than a rate of discharge of another battery bank (such as battery bank 115).

Load 170 may comprise one or more internal or external loads. The load may be internal or external to the EPS. The load may be part of the EPS (such as a charger or other internal load) or merely coupled to the EPS. In one embodiment, a load of the EPS may be considered the charging system. In most applications, the load is an external load, such as any industrial, commercial, or residential load. In one embodiment, the electrical energy produced by the EPS may be distributed to load 170 for temporary or sustained usage via load battery system 115 to inverter 125 (if load is AC based) then to load 170. In one embodiment the EPS can functional normally and/or in normal operation without having a load connected. In other embodiments, the EPS can selectively turn on and off different loads that are connected to the EPS to maintain the desired battery levels of the system and other operating parameters, such as output power, voltage, or frequency. In one embodiment the EPS may operate in an energy conserving status or a battery recharging status such that the supply battery system 110 is recharged by directing most of the power produced from alternator 150 to battery system 110.

Control system 180 is electrically coupled to one or more of the components within EPS 100. The charging system of EPS 100 (as well as other components within EPS 100) is controlled by control system 180. In one embodiment, portions of control system 180 are electrically coupled to each of the components within EPS 100, and is used to regulate the production, management, and distribution of electrical energy within the EPS and to one or more of the connected loads. In one embodiment, the control system comprises one or more control units, sensors, and a plurality of inputs and outputs electrically connected to each of the EPS electronic components. In one embodiment, the control system manages the battery power within the EPS by controlling the charging and discharging of the battery banks via electronic instruction by using a series of mechanical and electronic devices to analyze, optimize, and perform power production, load servicing, and charging functions in sequence to achieve the particular goals/attributes of the EPS. In one embodiment, the control system manages the charge of battery system 110 (the supply battery system) by controlling the output power provided by the EPS and/or the loads serviced by the EPS. In one embodiment, the control system manages the input current/power provided by battery system 110 to motor 130 to achieve the desired output power provided by alternator 150.

As is known in the art, the control system may comprise one or more programmable logic controllers (PLCs). In general, a PLC is a known control device used in industrial control applications that employs the necessary hardware architecture of a computer and a relay ladder diagram language. It may be a programmable microprocessor-based device that is generally used in manufacturing to control assembly lines and machinery as well as many other types of mechanical, electrical, and electronic equipment. PLCs may be programmed in a variety of computer languages, and in one embodiment may be programmed in an IEC 61131 language. The PLCs and other components of the control system have been programmed by methods known in the art to enable individual control of each of the components in the EPS during normal operation.

The control system may further comprise programmed instruction with computerized control by known methods, including but not limited to a programmed logic controller (PLC), a personal computer, or commands transmitted through a network interface. Any control units of the control system may monitor the EPS system parameters such as voltage, current, temperature, rotational speed, vibration, frequency battery charge, load demand, alternator output, motor output, electrical energy inputs and outputs, etc., by receiving data from a plurality of sensors including but not limited to temperature sensors, current sensors, electricity demand sensors, and electrical charge-discharge sensors. The control system is configured to interpret or analyze the data according to programmed instructions/protocols and output necessary commands. In one embodiment, any received data input is processed in a control unit of the control system according to programming or command instructions, and instructions will be electronically output to a plurality of electrical switches and electrical valves within the control system and EPS to maintain system electricity generation and energy storage as required.

In one embodiment, when the control system signals a release of electrical energy, the electrical energy flows through an electrical supply line to a PLC/PC logic controller according to system electric demand. An electrical controller directs current flow through one or more of a plurality of electrically connected electrical control lines, which may be connected to motor 130. Electrical energy passing through an electric rotary motor 130 will cause the motor to rotate its output shaft which is in turn connected to a coupling 140 which is in turn connected to the input shaft of a specific alternator 150 designed to output a specific amount of electrical current. The alternator 150 may also be electrically connected (via charger 160) to specific battery storage units 110, 115. In one embodiment, current outflow from alternator 150 is directed into respective return electrical lines electrically connected to battery banks 110, 115 to complete the electrical circuit and return the electrical current back to the battery bank(s) for reuse. Thus, the control system is configured to monitor and control the battery systems and output from the alternator for optimal power distribution and battery recharging. This control feature permits disengagement of alternator 150 or diversion of the alternator output to assist in charging a battery unit.

In operation, electric motor 130 withdraws power from battery system 110 (which may or may not be regulated by inverter 120), which causes an output shaft of electric motor 130 to rotate. Thus, electrical energy is converted to mechanical energy. An input shaft of the coupled alternator 150 is rotated by direct mechanical connection to the output shaft of the motor via coupler 140. The alternator is energized to generate a specific output of electrical energy based on the design requirements and intended use/application of the EPS. Thus, mechanical energy is converted to electrical energy. The electrical energy produced by rotation of alternator 150 is directed to charging system 160. Thus, the mechanical energy from electric motor 130 is transferred to the electrical energy generator (alternator 150) to produce electrical energy for distribution and use by the EPS.

In one embodiment, the disclosed EPS may be scaled to fit large or small load demands. In one embodiment, the motor is similarly sized to the alternator. For larger load demands, a plurality of permanent magnet couplers may be utilized in series (which create an enhanced power amplification factor for the particular EPS), or a plurality of EPS systems may be combined to service a single load.

Magnetic Electric Power Station (MEPS)

The disclosed EPS utilizes specific components with permanent magnets that provide for increased torque, decreased power usage, and/or amplified power output to further increase the outputted power or torque based on the same amount of input, or similarly, to produce the same amount of power or torque based on a decreased power input. In one embodiment, the use of one or more magnetically enhanced devices significantly increases various benefits of the MEPS, including the ability to produce increased torque and/or increased RPM at the same electrical input, the ability to operate the motor and/or alternator at higher rates/RPMs based on the same or less electrical input, and/or the ability to generate a certain amount of power based on less input energy. In one embodiment, these added benefits overcome any negative side effects such as heat loss, device inefficiencies, etc. based on the increased number of system components.

In one embodiment, the combination of a motor and alternator/generator may be referred to loosely as a "genset," otherwise known as an engine/generator. As is known in the art, a "genset" generically refers to a set of separate devices or equipment that is combined together into a single "device" that is used to convert mechanical energy into electrical energy. For example, a conventional engine-generator or portable generator is the combination of an electrical generator and an engine (prime mover) mounted together to form a single piece of equipment; this combination is also called an engine-generator set or a gen-set. For the purposes of this disclosure, a genset includes a motor and an alternator/generator, and may include (but does not necessarily include) a coupling device between the motor and the alternator/generator.

In one embodiment, the use of specially arranged permanent magnets in each of the motor, coupler, and/or generator increases the magnetic field over each of the devices and varies different attributes of the torque, rotation, etc. of the EPS. While electricity may be provided to the particular magnetically enhanced device (e.g., an active magnetic device), in some embodiments the magnetic device may simply comprise a plurality of magnets without requiring additional energy (e.g., a passive magnetic device).

For the purposes of this disclosure, a magnetically enhanced device is a novel device and is not merely a device that utilizes a magnetic field as conventionally performed in the prior art. As is known in the art, conventional motors and alternators typically use some type of magnetic field for their normal operation. A typical motor may have a rotor and a stator with one or more electric coils in the stator to create an induced magnetic field in the rotor; however, a conventional motor does not utilize permanent magnets within the rotor. Likewise, a typical alternator may have a rotor with magnets that create an induced magnetic field in the stator; however, a conventional alternator does not utilize permanent magnets within the stator. In one embodiment, the disclosed MEPS uses a typical motor and/or a typical alternator with a magnetic coupling device, whereas in other embodiments the disclosed MEPS uses a novel magnetically enhanced motor and/or a magnetically enhanced alternator. For this disclosure, a "magnetic motor," a "magnetic coupler," and a "magnetic alternator" (or "magnetic generator") have special meanings.

In one embodiment, a "magnetic motor" as described herein is an electric motor that includes a stator and a rotor and a plurality of permanent magnets coupled to the rotor. In operation, the magnetic field of the motor is increased because of the static magnetic field of the permanent magnets on the rotor and the induced magnetic field of the stator by application of a (small) induced current into one or more coils within the stator and surrounding the rotor. The overall magnetic field is an enhanced magnetic field that combines a magnetic field of the rotor (B1) and the induced magnetic field of the stator (B2), which overall increases the torque/power output from the motor as compared to a conventional motor. Similar to a conventional motor, together, the rotor and stator produce a rotary force output from the motor based on supplied electrical energy to the stator. In contrast to prior art motors, the disclosed magnetic motor comprises a plurality of permanent magnets coupled to the rotor.

In one embodiment, a "magnetic coupler" as described herein is a mechanical coupler between two devices that comprises a plurality of permanent magnets. In one embodiment, the magnetic coupling device couples the prime mover (motor) to the alternator/DC generator, while in other embodiments it may be considered as a secondary prime mover as it helps and/or increases the torque provided by the motor to the alternator/DC generator. The magnetic coupler comprises permanent magnets that may be positioned on either (i) a rotor (e.g., the magnets may be coupled to one or more rotatable shafts within the magnetic coupling device, thereby rotating with the rotatable shafts) or on (ii) a rotor (rotating magnets) and a stator (stationary magnets) within the magnetic housing. In addition, the magnetic coupler may partially or entirely surround the output shaft of a motor and/or the input shaft of the alternator. In a first operation, a magnetic field is created based on a (small) induced current into one or more coils surrounding the rotor with permanent magnets (creating magnetic field B1); the induced rotating magnetic field of the magnetic coupler increases the torque/power output from the magnetic coupler. In a second operation, a magnetic field is present based on the first plurality of permanent magnets within the rotor (B1 magnetic field) and the second plurality of permanent magnets (B2 magnetic field) within the housing/stator; based on the rotation of the inner magnets coupled to the shaft, which is coupled to the motor output shaft, the rotating inherent magnetic field of the magnetic coupler increases the torque/power output from the magnetic coupler. Thus, as compared to a conventional spider coupling, the described magnetic coupling increases the produced torque/power based on the inherent magnetic field of the permanent magnets.

In one embodiment, a "magnetic generator" (or "magnetic alternator") as described herein is an alternator or generator that includes a plurality of permanent magnets on both the rotor and the stator of the generator. In operation, the overall magnetic field of the generator/alternator is increased because of the static magnetic field of the permanent magnets on the outer shell of the stator. The overall magnetic field is an enhanced magnetic field that combines a magnetic field of the rotor (B1) and a magnetic field of the stator (B2), which overall increases the torque/power output from the motor as compared to a conventional generator (which may only have permanent magnets coupled to a rotor and not the stator). In effect, the generator is able to vary a magnetic field from static to kinetic to amplify the power output based on given mechanical movement. Similar to a conventional alternator, together, the rotor and stator convert a rotary force input into electrical energy. In contrast to prior art alternators/generators, the disclosed magnetic alternator comprises a plurality of magnets coupled to the stator and/or part of a housing that surrounds the rotor and/or rotating input shaft of the alternator.

Figure 2:
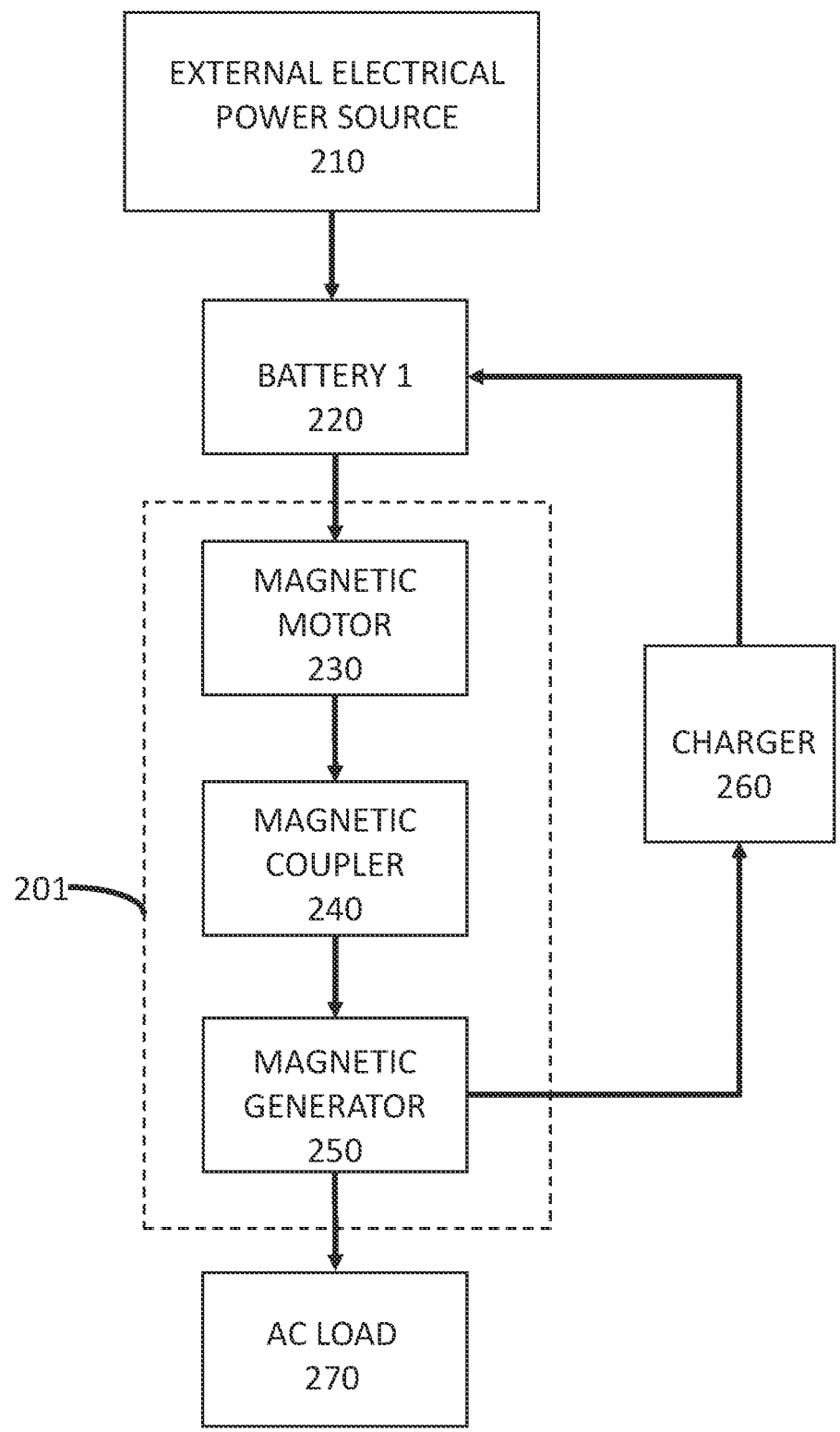
FIG. 2 illustrates an electrical flow diagram of another embodiment of an electrical power station of the present disclosure.

FIG. 2 illustrates an embodiment of an electrical flow diagram of a magnetic electrical power station ("MEPS") according to the present disclosure. FIG. 2 illustrates a system substantially similar to that described in FIG. 1 and similarly converts stored chemical energy (such as from a battery) into mechanical motive energy to cause rotation of an alternator or generator to produce electricity to one or more loads and to simultaneously recharge the battery system. In some embodiments, output power from a generator may not need to be re-routed from the generator to the supply batteries if the input power from the external power source is sufficient to offset any discharge of the batteries to provide the necessary power output of the system. In other words, if the loads are small enough, re-routing of the generator power to re-charge the battery systems may not be needed. One or more of the motor, coupler, or alternator/generator may be a magnetically enhanced device as described herein. In particular, the present disclosure focuses on a magnetic coupler.

Referring to FIG. 2, a magnetic EPS ("MEPS") is illustrated that includes battery system 220 (i.e., source/supply batteries), motor 230, coupler 240, alternator/generator 250, and charger 260. The EPS may comprise and/or be coupled to external electrical power source 210 (such as a solar assembly array) and one or more external loads 270. This system may be AC based or may be DC based, and inverters or rectifiers would be needed as known in the art. The generator may be an AC based alternator (which would need an inverter if the load is DC based) or a DC based generator (which would need an inverter if the load is AC based). In one embodiment, the motor, coupler, and alternator of the system is considered a separate unit, as illustrated by the dashed boxed around the collective units. Together, the motor, coupler, and alternator/generator are considered as "genset" 201. The individual components illustrated in FIG. 2 may be substantially similar to those described in FIG. 1. The MEPS requires a control system (such as control system 180) as described herein.

For the MEPS unit, one or more of the MEPS components magnifies the power of the system; in other words, the power input to motor 230 from the source battery system 220 is magnified as an output from alternator/generator 250. In one embodiment, the described MEPS includes any one of the motor, coupler, or alternator as having a magnetically enhanced device. In other embodiments, two of the devices may comprise magnetically enhanced devices (such as motor and coupler, motor and alternator, or coupler and alternator). In still another embodiment, all three of the devices (motor, coupler, and alternator) may comprise a magnetically enhanced device. For illustration purposes, FIG. 2 shows that motor 230 is a magnetic motor, coupler 240 is a magnetic coupler, and generator 250 is a magnetic generator. In one embodiment, magnetic motor 230 comprises a plurality of permanent magnets coupled to a rotor of the motor. In one embodiment, magnetic generator 250 comprises a plurality of permanent magnets coupled to a stator of the generator, and may include a second plurality of permanent magnets coupled to a rotor of the generator. In one embodiment, magnetic coupler 240 comprises a first plurality of permanent magnets that are rotatable and a second plurality of permanent magnets that remain still. In one embodiment, the plurality of permanent magnets may comprise magnets of different strengths and arranged next to different strength magnets to facilitate movement/slippage of the shaft/rotor within the magnetic device.

In the embodiment of FIG. 2, the overall system has three enhanced magnetic devices. Assuming that each device produces either 2X electrical power output or requires ½ electrical power input, then the overall power amplification effects would be two, four, or eight times, based on whether one, two, or three separate magnetic devices are utilized. Thus, if a single magnetic device were utilized, the power amplification affects based on the use of magnetic devices (and corresponding permanent magnets) would be approximately 2 times. Likewise, if two magnetic devices were utilized, the overall enhancement would be approximately 4 times power output, and if three magnetic devices were utilized the overall power enhancement would be approximately 8 times. Of course, the actual power amplification factor depends on the particular configuration of magnets for each device and any inputted electrical power and variations thereof.

Magnetic Coupler

In general, a coupler is a device that connects a first device (such as a motor) to a second device (such as an alternator or generator). While prior art couplers are typically mechanical couplers, there are other various types of known couplers. The present disclosure is directed to a magnetic coupler that may couple to and/or at least partially surround a conventional mechanical coupler that connects a first shaft to a second shaft (such as an output shaft of a motor and an input shaft of an alternator/generator). In one embodiment, the disclosed magnetic coupler modifies the rotation of a first device to a modified rotation rate and applies that modified rotation to a second device. In general, the magnetic coupler is not limited to specific devices to which it can transfer power or rotation. For example, a wide variety of generators, motors, electronic components, and rotatable shafts may be connected to and/or enclosed by the disclosed magnetic coupling device. In one embodiment, the disclosed magnetic coupler can be used as the coupler in the electric power station disclosed in U.S. Pat. No. 9,768,632 ("the '632 patent"), incorporated herein by reference.

In one embodiment, a magnetic coupler as described herein is a mechanical coupler between two devices that comprises a plurality of permanent magnets. The permanent magnets may be positioned on (i) a rotor (e.g., the magnets may be coupled to one or more rotatable shafts within the magnetic coupling device, thereby rotating with the rotatable shafts) or on (ii) a rotor (rotating magnets) and a stator (permanent magnets) within the magnetic housing. In a first operation, a magnetic field is created based on a (small) induced current into one or more coils surrounding the rotor with permanent magnets (creating magnetic field B1); the induced rotating magnetic field of the magnetic coupler increases the torque/power output from the magnetic coupler. In a second operation, a magnetic field is permanent presently based on the first plurality of permanent magnets within the rotor (B1 magnetic field) and the second plurality of permanent magnets (B2 magnetic field) within the housing/stator; based on the rotation of the inner magnets coupled to the shaft, which is coupled to the motor output shaft, the rotating inherent magnetic field of the magnetic coupler increases the torque/power output from the magnetic coupler. Thus, as compared to a conventional spider coupling, the described magnetic coupling increases torque/power based on the inherent magnetic field of the permanent magnets.

The disclosed magnetic coupler provides numerous benefits, including increased torque, less energy, increase of horsepower, and the ability to run a coupled motor at slower speeds to produce a desired torque. In a further embodiment, the disclosed magnetic coupler is configured to actively vary the torque from a motor based on varying current to the magnetic coupler. Thus, the disclosed magnetic coupler is able to produce more torque with less energy. In one embodiment, the magnetic coupling device couples the prime mover (motor) to the alternator/DC generator, while in other embodiments it may be considered as a secondary prime mover as it helps and/or increases the torque provided by the motor to the alternator/DC generator.

Figure 3A:
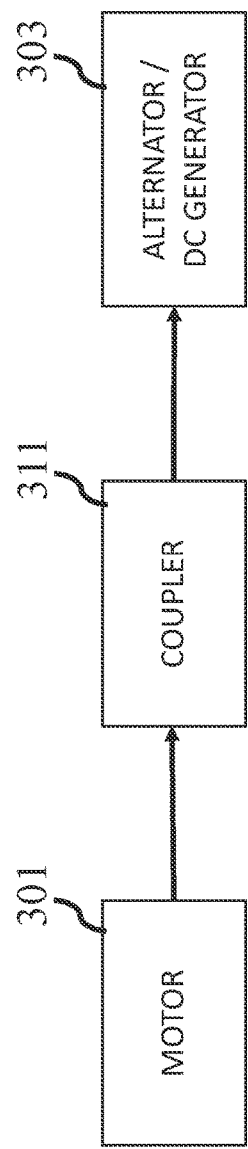
FIG. 3A illustrates a schematic of one embodiment of a motor coupled to an alternator according to the present disclosure.
Figure 3B:
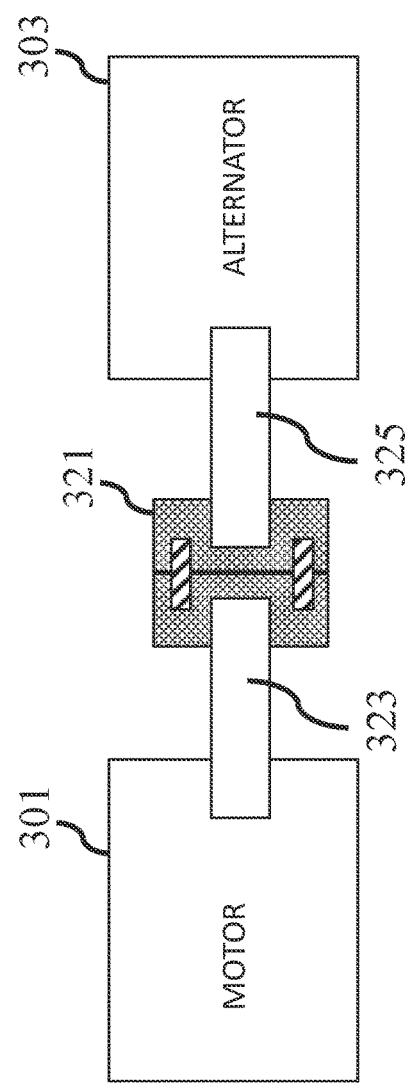
FIG. 3B illustrates a schematic of one embodiment of a motor coupled to an alternator by a mechanical coupling according to the present disclosure.
Figure 3C:
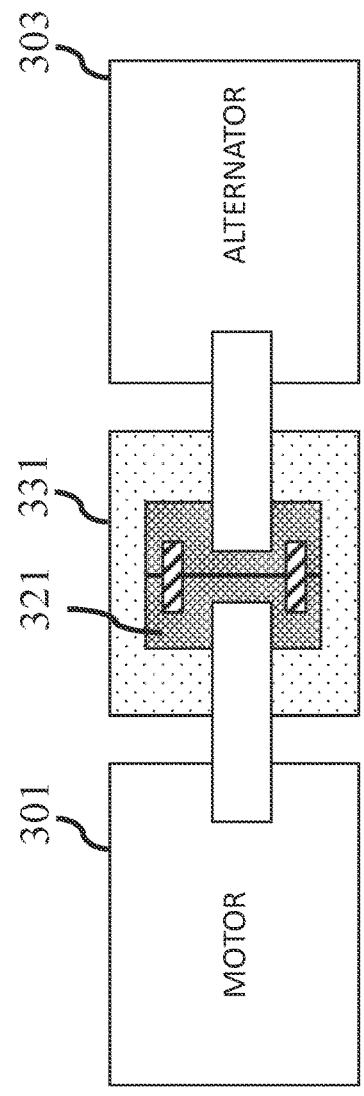
FIG. 3C illustrates a schematic of one embodiment of a motor coupled to an alternator by a magnetic coupling device according to the present disclosure.

FIGS. 3A-3C illustrate a high-level schematic of one embodiment of a motor coupled to an alternator according to the present disclosure. FIG. 3A illustrates a generic coupling device 311 that couples motor 301 to alternator 303 (or a DC generator). FIG. 3B illustrates mechanical coupling device 321 (which is a conventional spider coupling) that couples motor 301 to alternator 303 via first shaft 323 and second shaft 325. First shaft 323 may be the output shaft of the motor and second shaft 325 may be the input shaft of the alternator (or generator). The mechanical coupling device 321 is known in the art; in one embodiment device 321 may consist of two flanged portions that are bolted together, each of which is fastened to a portion of the respective shaft. Thus, in one embodiment it may be a 1:1 coupled ratio such that one turn of first shaft 323 rotates second shaft 325 by one turn. Other configurations of mechanical coupling device 321 are known.

FIG. 3C illustrates one embodiment of magnetic coupling device 331 according to the present disclosure. In one embodiment, it may consist of one or more magnetic portions surrounding mechanical coupling device 321 (which may be a conventional spider coupling) and/or portions of first shaft 323 and second shaft 325. The disclosed magnetic coupler may or may not be synchronous. In some embodiments, the output shaft speed equals the input shaft speed (e.g., a 1:1 ratio), while in other embodiments the output shaft speed and input shaft speed may vary. Components of magnetic device 331 are more fully described herein.

Figure 4A:
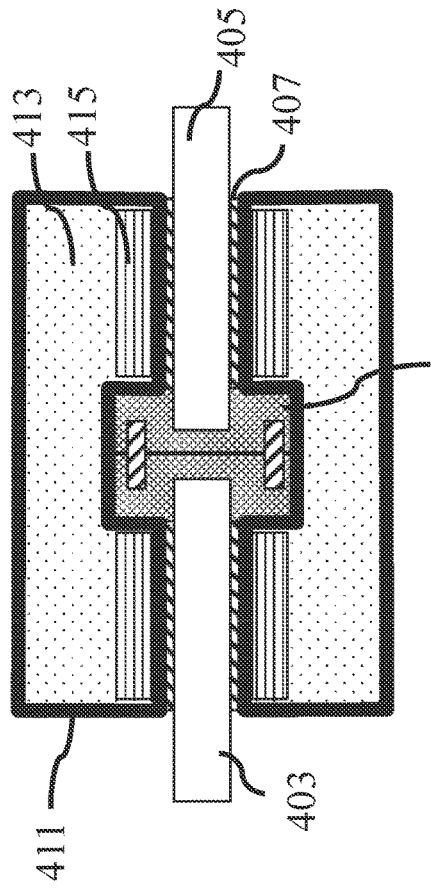
FIG. 4A illustrates an axial cross-section view of one embodiment of a magnetic coupling device according to the present disclosure.

FIG. 4A illustrates an axial cross-section view of one embodiment of a magnetic coupling according to the present disclosure.

Referring to FIG. 4A, in one embodiment, magnetic coupler 400 may be similar to magnetic device 331. In one embodiment, the coupler may consist of housing 411 that at least partially surrounds mechanical coupling device 401 that mechanically joins first shaft 403 with second shaft 405. In other words, the magnetic coupler may fully radially surround the shafts with axial portions of the shafts extending from the magnetic coupler housing. Lubricant 407 may exist between the rotating shafts 403, 405 and the magnetic coupler 400. Magnetic coupler 400 may comprise housing 411, which may be a non-ferrous material such as aluminum. The magnetic coupler 400 may also comprise an insulating material 413, such as bakelite or similar material. Bakelite is known in the art and may be desired for its electrical nonconductivity and heat-resistant properties and to prevent a magnetic flux from escaping.

Figure 4C:
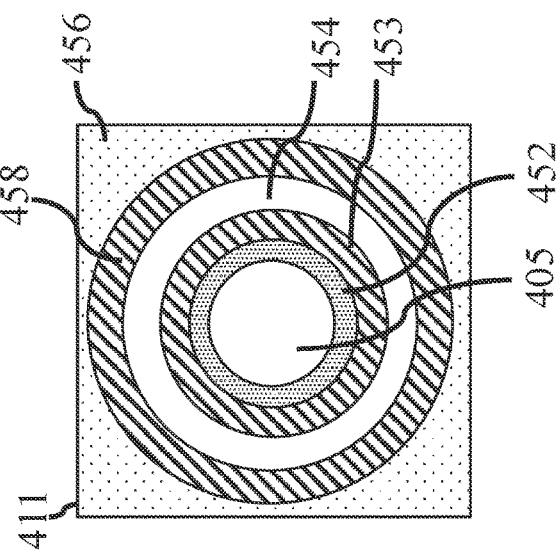
FIGS. 4B and 4C illustrate a radial cross-section view of various embodiments of a magnetic coupling device according to the present disclosure.
Figure 4B:
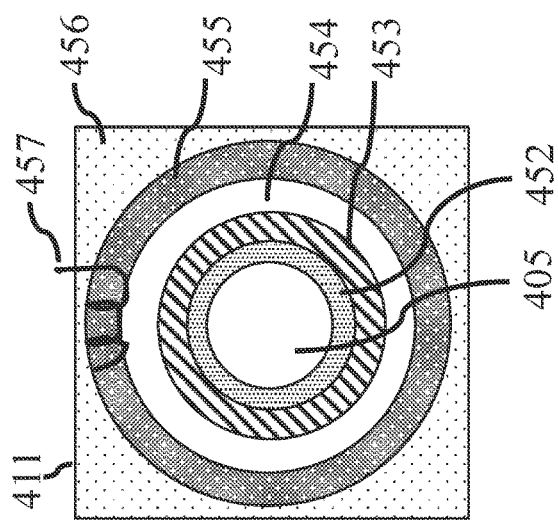

The magnetic coupler 400 also comprises a plurality of permanent magnets 415, such as repulsion and attraction magnets. The permanent magnets may be concentrically arranged around a rotating shaft within one or more concentric layers of magnets, as more detailed in FIGS. 4B and 4C. As illustrated in FIG. 4B, one or more sections of the magnetic coupler may comprise coils for varying the magnetic field created by the magnets. As illustrated in FIG. 4C, the magnetic coupler may also include additional layers of permanent magnets instead of a coil to vary the magnetic fields within the coupling device. In one embodiment, the permanent magnets may be neodymium magnets, which are permanent magnets made from an alloy of neodymium (Nd), iron (Fe), and boron (B). In general, neodymium magnets are graded according to their maximum energy product, which relates to the magnetic flux output per unit volume. Higher values indicate stronger magnets, and may range from N38 up to N54 or greater. In one embodiment, the disclosed magnetic coupler uses a plurality of strengths of solid core neodymium magnets in various combinations, sizes, and arrangements.

FIGS. 4B and 4C illustrate a radial cross-section view of various embodiments of a magnetic coupling device according to the present disclosure, both of which may be substantially similar to the embodiment illustrated in FIG. 4A. FIG. 4B illustrates a magnetic coupling device with a plurality of permanent magnets coupled to a rotating shaft and a coil that induces a magnetic field around the plurality of magnets. FIG. 4C illustrates a magnetic coupling device with a first plurality of permanent magnets coupled to a rotating shaft and a second plurality of permanent magnets that surrounds the first plurality of magnets. While shaft 405 is illustrated in FIGS. 4B and 4C, shaft 403 may likewise be coupled to the permanent magnets, and in some embodiments both shaft 403 and shaft 405 may be coupled to the permanent magnets as illustrated in FIG. 4A. In one embodiment, shaft 403 is the output shaft of a motor and shaft 405 is an input shaft of a generator. In one embodiment, shaft 405 is the shaft for a second (or third) magnetic coupling device in series to a first magnetic coupling. In one embodiment, only the output shaft from the motor (such as shaft 403) may include an external magnetic housing, while in other embodiments only the input shaft to the generator/alternator (such as shaft 405) may include an external magnetic housing.

Referring to FIG. 4B, shaft 405 (or shaft 403) is coupled to a plurality of permanent magnets 453, such as neodymium magnets. Magnets 453 may be arranged concentrically around shaft 405. Magnets 453 may be located at a first radial position around the shaft, and in some embodiments may be separated by the shaft by a first layer of insulation material 452. Magnets 453 may rotate with the shaft 405 as it rotates. The magnets may be coupled to the shafts in a variety of ways as is known in the art. Attachment of the magnets to the shaft is discussed in greater detail in relation to FIGS. 5E and 5F. In one embodiment, each of the plurality of magnets 453 have the same strength, while in other embodiments a plurality of different strength magnets are utilized (as illustrated in FIG. 5A). One or more electric coils or windings 457 may be located external to the plurality of magnets 453. The coil may be located within a concentric ring 455 (which may be a ferrous or other conductive material) or otherwise exterior to the permanent magnets. The induction coil material 455 may substantially surround a radial portion of the plurality of magnets and be separated by the magnets by air gap 454. In one embodiment, the air gap is between approximately 0.01 mm and 1 mm, and in one embodiment may be approximately 0.1 mm. The smaller the gap, the stronger the magnetic flux. A second layer of insulation material 456 may be located exterior to the induction coil 457 and/or metallic material layer 455 and within the overall magnetic housing 411. In one embodiment, supplying an electrical current to coil 457 increases the electric magnetic field applied by the energized permanent magnets 453. In one embodiment, the supplied electricity helps to rotate the shaft (with coupled magnets 453) by an induced magnetic field. Similarly, rotation of the shaft based on a mechanical output of a motor likewise increases the magnetic field. In one embodiment, each coupler end has three coil windings 457 coupled to and/or within metallic layer 455. In one embodiment, each of the plurality of magnets 453 has the same strength, while in other embodiments a plurality of different strength magnets are utilized (as illustrated in FIG. 5A).

FIG. 4C is similar to the embodiment in FIG. 4B but includes an outer layer of magnets in lieu of the coils. For example, referring to FIG. 4C, shaft 405 (or shaft 403) is coupled to a first plurality of permanent magnets 453, such as neodymium magnets. First plurality of magnets 453 may be arranged concentrically around shaft 405. Magnets 453 may be located at a first radial position around the shaft. First plurality of magnets 453 may rotate while the shaft 405 rotates. In one embodiment, first plurality of magnets 453 are coupled to the shaft, and may be included within a ring that is pressed or a sheath or ring that is slid around the shaft. Second plurality of magnets 458 may be located exterior to the first plurality of magnets 453. In one embodiment, the second layer of magnets are glued or otherwise securely fastened to an inner surface of the external housing. Similar to the first plurality of magnets, the second plurality of magnets may be concentrically positioned around the shaft. Thus, the magnetic coupler may comprise a first plurality of magnets 453 (e.g., inner magnets) located at a first radial position around the shaft and a second plurality of magnets 458 (e.g., outer magnets) located at a second radial position around the shaft. The two layers of magnets may be separated by air gap 454. In one embodiment, the air gap is between approximately 0.1 mm and 1 mm. The smaller the gap, the stronger the magnetic flux. A first layer of insulation material 452 may be located between shaft 403 and the first plurality of magnets, and a second layer of insulation material 456 may be located exterior to the second plurality of magnets and within the overall coupler housing 411. In one embodiment, each of the first plurality of magnets 453 as the same strength, while in other embodiments a plurality of different strength magnets are utilized for the first layer of magnets (as illustrated in FIG. 5A). Similarly, in one embodiment, each of the second plurality of magnets 458 has the same strength, while in other embodiments a plurality of different strength magnets are utilized for the second layer of magnets. Each layer of magnets 453, 458 may comprise a plurality of adjacent attractive and repulsive permanent magnets arranged in particular configurations (and sizes and strengths) to provide the desired magnetic field for the magnetic coupler. In one embodiment, rotation of the shaft based on a mechanical output of a motor likewise increases the magnetic field based on the interaction of the magnetic flux of the first layer of magnets and the second layer of magnets.

In one embodiment, the first plurality of inner magnets 453 rotate with shaft 403 (e.g., it behaves like a rotor), while the second plurality of outer magnets 458 remain still in a substantially fixed position within the housing and/or relative to the first plurality of magnets (e.g., it behaves like a stator). Thus, the magnetic coupler may be considered to have a rotor portion (e.g., inner magnets 453) and a stator portion (e.g., outer magnets 458). In one embodiment, the arrangement of the inner and outer magnets (FIG. 4C) creates an induced (and unstable) magnetic field that creates constant movement between the inner and outer magnets. In one embodiment, the individual size, strength, placement, and configuration of the magnets causes a magnetic flux between the north and south poles of the magnets, thereby creating torque. As is known in the art, one cannot have torque without rotation, and vice versa. Similarly, application of a current to the one or more coiled windings (FIG. 4B) creates a variable magnetic field that, when combined with an input shaft turning at a low rpm, causes the stator to produce a much higher torque and speed of the shaft. For example, in one embodiment, the input shaft may be rotated at a rate of 400 RPM, but paired with the disclosed magnetic coupler (whether via the embodiment of FIG. 4B or 4C) the shaft may be rotated at a rate of 1800 RPM based on the same input power. Thus, the disclosed magnetic coupler modifies the created torque from a motor and increases the torque with no to little extra energy required.

In effect, use of the rotating permanent magnets coupled to the rotatable shaft(s) produces a rotating magnetic field for the magnetic coupler. When paired with an induced magnetic field by electric coils (FIG. 4B) or a static magnetic field by an outer layer of permanent magnets (FIG. 4C), the magnetic flux of the magnetic coupling deices effectively increase the magnetic flux of the shaft to increase the output power based on the same amount of input power. Regarding the embodiment of FIG. 4B, the magnetic flux (B) is the magnetic flux of the first layer of permanent magnets coupled to the shaft ($B_{rotor}$) in summation to the magnetic flux of the electrically induced coils radially outwards to the first plurality of magnets within the magnet housing ($B_{coil}$). Regarding the embodiment of FIG. 4C, the magnetic flux (B) of the coupler is the magnetic flux of the first layer of permanent magnets coupled to the shaft ($B_{rotor}$) in summation to the magnetic flux of the second layer of permanent magnets radially outwards to the first plurality of magnets within the magnet housing ($B_{stator}$). In one embodiment, for comparison purposes, the electromagnetic field of the embodiment in FIG. 4B may be 2 Tesla and produce a torque of 20 Newton meters and 2 kVa based on a given motor/alternator arrangement, while the same motor/alternator arrangement utilized with the FIG. 4C embodiment may be 4 Tesla and produce a torque of 40 Newton meters and 5 kVa. In one embodiment, the axial torque of the shaft(s) may be increased by a factor of at least two times, three times, or five times or more. Such a power amplification depends on the strength and arrangement of the magnets, the amount of applied current, and the RPM of the rotating shafts.

FIG. 5A illustrates a cross-sectional schematic of one embodiment of a magnetic coupler according to the present disclosure. In one embodiment, FIG. 5A may be substantially similar to the embodiment illustrated in FIG. 4C. In particular, FIG. 5A shows the arrangement of a plurality of permanent magnets within a plurality of radial levels around a rotatable shaft 501 (which may be one or more shafts such as those coupled to a motor or alternator). The magnetic coupler 500 may comprise a first layer of inner magnets 510 at a first radial position and a second layer of outer magnets 520 at a second radial position. Each layer of magnets has a plurality of magnets positioned adjacent to each other. For simplicity, only a few of the magnets within each level are shown. In one embodiment, the first plurality of magnets 510 rotates with the shaft (to create a rotating magnetic field) and the second plurality of magnets 520 remains stationary/fixed (creating a static magnetic field). In one embodiment, the second level of magnets 520 is considered a stator portion of the magnetic coupling device and the first level of magnets 510 is considered a rotor portion of the magnetic coupling device.

In one embodiment, each magnet within each layer is spaced apart by only 100,000 of an inch and is separated by an insulating layer of material, such as a thin polymer. Of course, the sizing and spacing of the magnets is variable based on the sizes of the magnets and design of the coupler itself. As illustrated, each adjacent magnet is illustrated with a north or south pole, showing the attractive and/or opposing forces between the different magnets. In one embodiment, the first and second levels of magnets are separated by air gap 554. In one embodiment, the air gap should be as minimal as possible to create a greater magnetic field and not allowing locking of the rotor within the housing. In one embodiment, the air gap should be between 0.01 mm and 1 mm, such as approximately 0.1 mm. In one embodiment, the first layer of magnets 510 is separated by the rotor by an insulating layer 502; in some embodiments, an insulation layer may not be necessary.

In one embodiment the number of magnets in the inner layer is greater than the number of magnets in the outer layer; in another embodiment, the number of magnets in the outer layer is greater than the inner layer. For example, in one embodiment, there may be nine magnets within the inner layer 510 and eight magnets within the outer layer 520. Of course, other arrangements and numbers is possible. In one embodiment, the number of magnets in the outer layer is different than the number of magnets in the inner layer to create constant slippage and to prevent locking (which might be more likely to occur if there is an even number of magnets between the inner layer and the outer layer). For example, the inner layer of magnets may be eight magnets, and the outer layer of magnets may be seven or nine magnets; as another example, the inner layer of magnets may be thirteen magnets, and the outer layer of magnets may be twelve or fourteen magnets. In one embodiment, a greater number of magnets is desired to create a larger and more uniform magnetic field. Further, the number of magnets depends on the size and configuration of the magnets and the size of the shaft and magnetic coupling device/housing. While the illustration in FIG. 5A represents one cross-section of the magnetic coupler, in practice the magnets may be extended an axial direction in a linear or diagonal pattern, similar to that described in FIGS. 5C and 5D. Still further, rather than a single magnet having a certain axial length, a plurality of magnets may be axially positioned adjacent for the necessary axial length of magnets. Thus, while one embodiment of FIG. 5A shows nine inner magnets at a first radial position, it may have multiple axial groups of nine radial magnets, such that the number of inner magnets may be some multiple of the nine radial magnets.

In one embodiment, each layer of magnets may comprise a plurality of adjacent attractive and repulsive permanent magnets arranged in particular configurations (and sizes and strengths) to provide the desired magnetic field for the coupler. For example, first magnet layer 510 may comprise first magnet 511 adjacent to second magnet 512 adjacent to third magnet 513. First magnet 511 may have a first strength (such as N42), second magnet 513 may have a second strength (such as N38), and third magnet 513 may have a third strength (such as N52). In one embodiment, each of the magnets may be a neodymium magnet between N38-N54, although other types of magnets and strengths are possible. This pattern repeats itself around the radius, with alternating magnet strengths of 1, 2, 3, 1, 2, 3, 1, 2, 3. In one embodiment, the magnets are arranged in an order that is not numerically from the smallest to the largest strengths. For example, rather than having the magnets arranged from N38, N42, and N52, the magnets may be arranged as N42, N38, N52, which also helps rotation. As illustrated in FIG. 5A, the north and south pole of each magnet is arranged opposite to each other. In some embodiments, there may only be two different strengths of magnets while in other embodiments there may be four or more different strengths of magnets. Further, in another embodiment, all of the magnets in the first plurality of magnets have the same strength.

Similar to the first layer of magnets, second layer 520 may comprise a second plurality of magnets that are adjacent each other with opposing north and south poles, as illustrated in FIG. 5A. First magnet 521 may be adjacent to second magnet 522, with a north pole of first magnet 521 adjacent to a south pole of second magnet 522. In one embodiment, all of the second plurality of magnets have a constant strength, which may be between N38-N54 neodymium magnets. In another embodiment, there may be two, three, or more different magnet strengths within the second layer of magnets, similar to the first layer of magnets. In one embodiment, the inner plurality of magnets 510 are not arranged at the identical position of the outer plurality of magnets 520 to help create slippage and/or rotation of the magnets.

FIG. 5B illustrates a cross-sectional view of one embodiment of a magnet used in the magnetic coupler of FIG. 5A. In one embodiment, magnet 551 is a neodymium magnet with a strength of N52. Magnet 551 may have a cross section in the shape of a parallelogram. Other shapes include triangles, circles, squares, and other quadrilaterals. In one embodiment, each of the magnets utilized within the magnetic coupler is a longitudinal magnet. Thus, the overall shape of the magnetic coupler (or at least the magnets within the coupler) may be cylindrical with a plurality of cylindrical magnets arranged adjacent to each other within each of the inner and outer levels of magnets. Still further, each magnet may be angled, such that the overall shape of the magnets is slightly twisted or wrapped. In one embodiment, the opposing end sides of the magnet have separate north and south poles. In another embodiment, the opposing faces of the magnet have the north and south poles. The present disclosure is not limited by the shape, thickness, configuration, or strength of the permanent magnet. While neodymium magnets may be one embodiment of the present disclosure, other higher strength magnets may similarly be utilized.

Figure 5G:
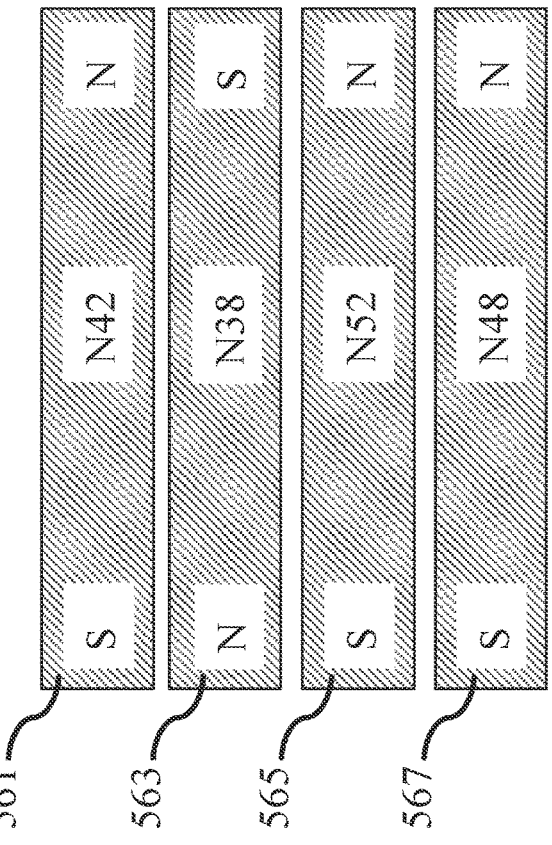
FIG. 5G illustrates a schematic view of one embodiment of an arrangement of magnets according to the present disclosure.
Figure 5F:
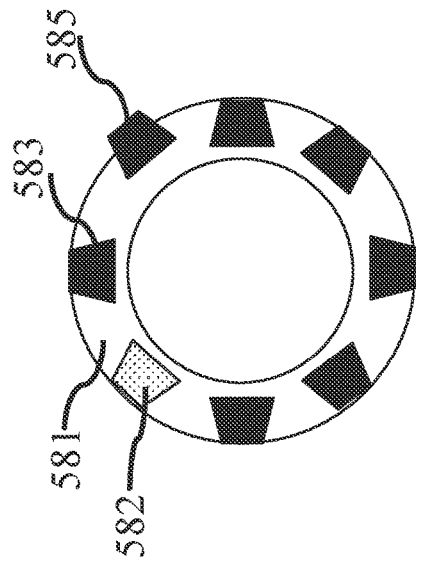
FIG. 5F illustrates a cross-sectional view of one embodiment of magnets arranged radially around a cylindrical object.
Figure 5C:
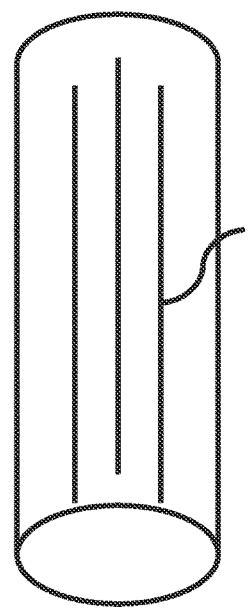
FIGS. 5C-5D illustrate a perspective view of one embodiment of magnets arranged along a cylindrical object.
Figure 5D:
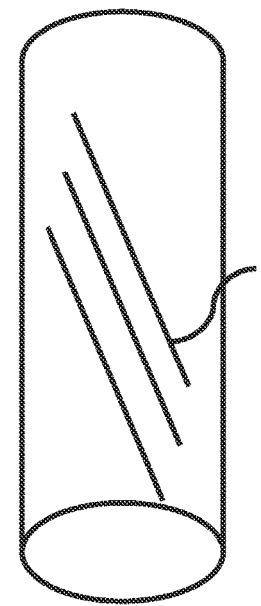

FIGS. 5C and 5D illustrate a perspective view of magnets arranged along a cylindrical object (which may be similar in shape to the disclosed magnetic coupler). The cylindrical object may be an external surface of a shaft that is enclosed by the coupler, or may be an inside surface of an external housing that is substantially cylindrical and encloses an inner shaft. In one embodiment, FIG. 5C shows magnets 571 in a substantially straight position along the magnetic coupler/cylindrical device, while FIG. 5D shows magnets 573 in a substantially angled position along the magnetic coupler/cylindrical device. The arrangement and spacing of the magnets strongly influences the effect of the magnetic field (both static and applied) from the magnets. In one embodiment, a twisting arrangement of the magnets (such as disclosed in FIG. 5D) helps create a slightly unstable magnetic field between the magnets and causes constant relative motion between the inner level of magnets (rotating) and the outer level of magnets (fixed) and helps to prevent "locking" of the rotor within the stator. In one embodiment, both the inner and outer magnets may be angled (such as that illustrated in FIG. 5D), or only one of the inner and outer sets of magnets may be angled. In general, the size, shape, strength, and arrangement of the magnets is variable based on the particular characteristics of the motor, alternator, coupling, and intended strength, rpm, torque, etc., thereof. While the magnets illustrated in lines 571 and 573 in FIGS. 5C and 5D show continuous lines, in practice the magnets may be arranged end to end or side to send in a long chain or series to create the layer of magnets.

Figure 5E:
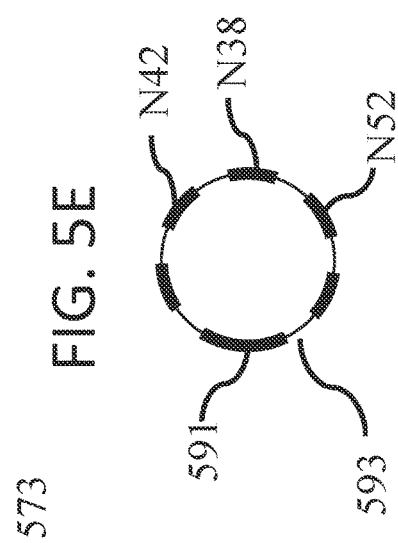
FIG. 5E illustrates a cross-sectional view of one embodiment of magnets arranged radially around a cylindrical object.

FIGS. 5E and 5F illustrate a cross-sectional view of one embodiment of magnets arranged radially around a cylindrical object. As discussed herein, magnets may be coupled to the rotatable shaft in a variety of ways. In one embodiment, the magnets are included within a ring that is pressed or slid around the shaft. In one embodiment, the magnets may fit within a groove or other machined opening of a metallic ring, such as that illustrated in FIG. 5F. For example, ring 581 may be substantially cylindrical and sized with an inner surface to be coupled to a shaft. A plurality of permanent magnets 583, 585 may be positioned at different positions around the ring such that together they are concentrically positioned around the shaft at a substantially first radial position. In one embodiment, the magnet may be substantially flush to an exterior surface of the ring, such as illustrated by magnet 583, or in other embodiments may extend outside of the ring and otherwise protrude or are exposed, such as illustrated by magnet 585. A plurality of grooves 582 may be machined into the ring into which the magnets are inserted. In another embodiment, the magnets may simply be glued together or directly coupled to the shaft and surrounded by a relatively thin (and non-conductive) outer sheathing, such as plastic, as illustrated in FIG. 5E. For example, magnets 591 may be positioned around the ring and enclosed by outer sheathing 593, which helps keep the magnets coupled to the shaft and prevents them from flying loos during rotation of the shaft. A layer of insulation may be necessary between the ring and the coupled shaft. Similarly, a second layer of magnets may be coupled to an inside portion of the stator housing in a variety of ways. For example, they may be positioned on a ring that is inserted into the housing (similar to FIG. 5F), or they may be directly glued or attached to the inside surface of the housing, such as in FIG. 5E. Because the magnets are stationary/fixed, an outer sheath may not be necessary as required in FIG. 5E.

FIG. 5G shows a schematic illustration of a plurality of permanent magnets arranged adjacent to each other. As illustrated, each adjacent magnet is arranged in alternating north and south poles. Also, each magnet is separated by a certain distance. Also, the arrangement of the magnets in FIG. 5G shows alternating magnet strengths of N42, N32, N52, and N48 for magnets 561, 563, 565, and 567, respectively. In one embodiment, this pattern is repeated for the given radial distribution. For example, the pattern may be 1, 2, 3, 4, 1, 2, 3, 4, etc. As another example, FIG. 5E shows magnet strengths of N52, N38, and N42, and this pattern could be repeated around the radial distribution of magnets.

Figure 6A:
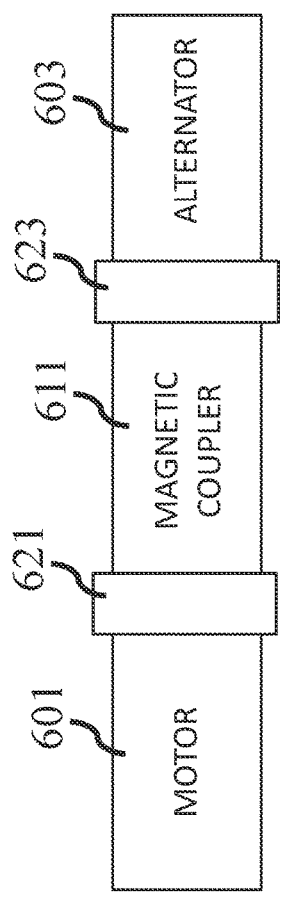
FIGS. 6A-6C illustrate schematics of a modular magnetic coupling system according to one embodiment of the present disclosure.
Figure 6B:
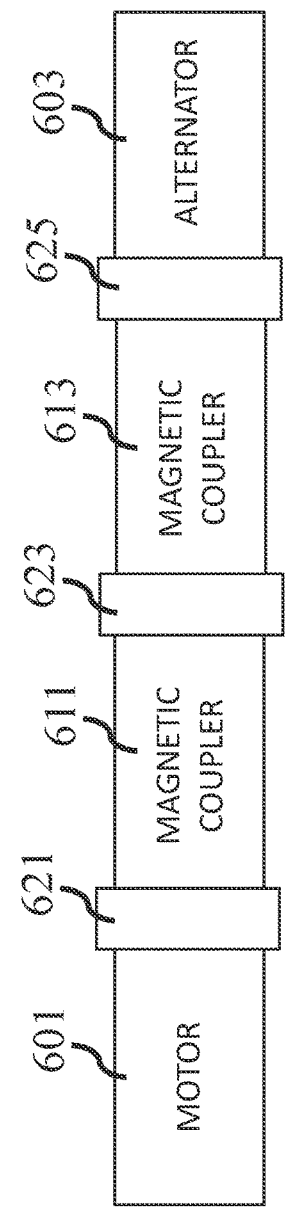
Figure 6C:
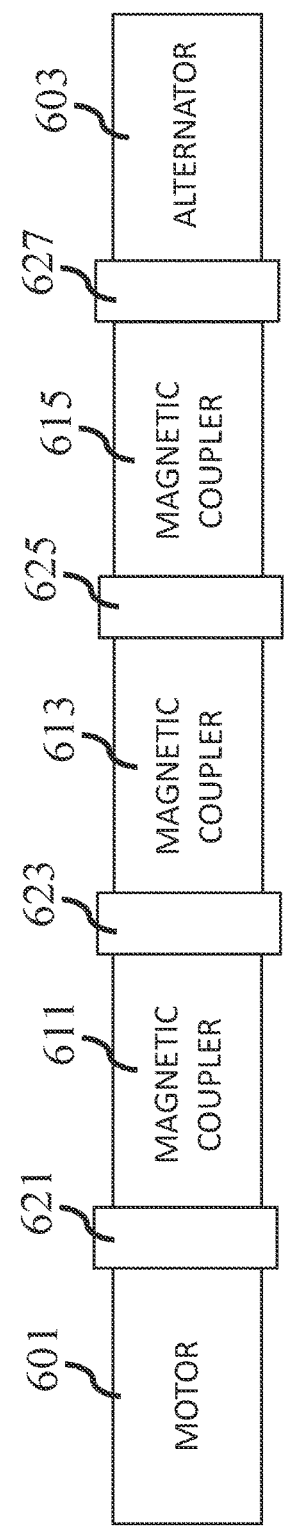

FIGS. 6A-6C illustrate schematics of a modular magnetic coupling system according to one embodiment of the present disclosure. In one embodiment, the disclosed magnetic coupler (such as magnetic coupler 400) can be paired with other similar magnetic couplers in series to multiply the desired effect to the overall system. Thus, a constant sized magnetic coupler can be designed to produce a desired effect, and depending on the particular motor/alternator system desired, multiple magnetic couplers can be coupled together in series to produce the desired effect and axial torque amplification. This modularity allows great variability to the overall motor/coupler/alternator system based on a single/constant magnetic coupler design. For example, the first magnetic coupling device may apply a first magnetic field B1 to the rotatable shafts, and the second magnetic coupling device may apply a second magnetic field B2 to the rotatable shafts, and thus the torque is increased by a factor of B1+B2 or 2× the magnetic field if both magnetic couplers are the same. In one embodiment, each magnetic coupler doubles the torque (such as 20 Newton meters if the standard torque was 10 Newton meters). For example, for a given motor, coupler, and alternator arrangement, if a single magnetic coupler produces a power output of 5 kVA, two magnetic couplers may produce a combined power output 10 kVA (5+5), and three magnetic couplers may produce a combined power output of 15 kvA (5+5+5). Additional couplers may be preferred instead of a single larger coupler for size and weight constraints and practical manufacturing and operation capabilities. In general, the magnetic coupling device acts as an axial torque amplifying device, which dramatically increases the axial torque for any system that utilizes the described magnetic coupling device.

FIG. 6A illustrates motor 601 coupled to alternator 603 (or generator) via a single magnetic coupler 611. This system is substantially similar to that of previously disclosed magnetic coupling systems herein, such as shown in FIG. 3C, and the magnetic coupler itself may be substantially similar to that described in FIGS. 4A-4C. In one embodiment, a flange or other fastening mechanism is located on each side of the magnetic coupler to secure it with the adjacent device. For example, magnetic coupler may have a first flange 621 for coupling to motor 601 and a second flange 623 for coupling to alternator 603. In other embodiments, the mechanical couplers/flanges may be located within the magnetic coupler itself. In one embodiment, based on the particularly sized motor and alternator, a single magnetic coupler may be used to produce the desired output power. For example, a 5 hp motor may be used in conjunction with a similar sized alternator and a single magnetic coupler to produce 5 kVA.

FIG. 6B is similar to the embodiment illustrated in FIG. 6A but includes an additional magnetic coupler. Motor 601 is coupled to alternator 603 via first magnetic coupler 611 and second magnetic coupler 613. Magnetic coupler 611 may have a first flange 621 for coupling to motor 601 and a second flange 623 for coupling to magnetic coupler 613, while magnetic coupler 613 may have a third flange 625 for coupling to alternator 603. In one embodiment, based on the particularly sized motor and alternator, both of the magnetic couplers (each of which may be the same size and configuration) may be used to produce the desired power. In one embodiment, if a 5 hp motor with a single coupler produces 5 kVA, two magnetic couplers may be used to produce 10 kVA. Of course, countless variations are possible based on the size of the motor/alternator and the particular arrangement of the magnetic device coupling. In one embodiment, magnetic coupler 611 and magnetic coupler 613 share an additional shaft (separate from the output shaft of the motor and an input shaft of the alternator) that mechanically transfers rotation from the first magnetic coupler to the second magnetic coupler. In some embodiments, each of the magnetic couplers is the same size and share similar flange and/or coupling configurations, while in other embodiments the magnetic couplers are sized and/or configured differently but share similar flange/coupling attachments.

FIG. 6C is similar to the embodiment illustrated in FIG. 6B but includes an additional magnetic coupler. Motor 601 is coupled to alternator 603 via first magnetic coupler 611 and second magnetic coupler 613 and third magnetic coupler 615. Magnetic coupler 611 may have a first flange 621 for coupling to motor 601 and a second flange 623 for coupling to magnetic coupler 613, while magnetic coupler 613 may have a third flange 625 for coupling to magnetic coupler 615, while magnetic coupler 614 may have a fourth flange 627 for coupling to alternator 603. In one embodiment, based on the particularly sized motor and alternator, each of the magnetic couplers (each of which may be the same size and configuration) may be used to produce the desired power. In one embodiment, if a 5 hp motor with a single coupler produces 5 kVA, three magnetic couplers may be used to produce 15 kVA. As another example, a 50 hp motor may be used in conjunction with three magnetic couplers to produce 75 kWA. Of course, countless variations are possible based on the size of the motor/alternator and the particular arrangement of the magnetic device coupling.

Figure 7A:
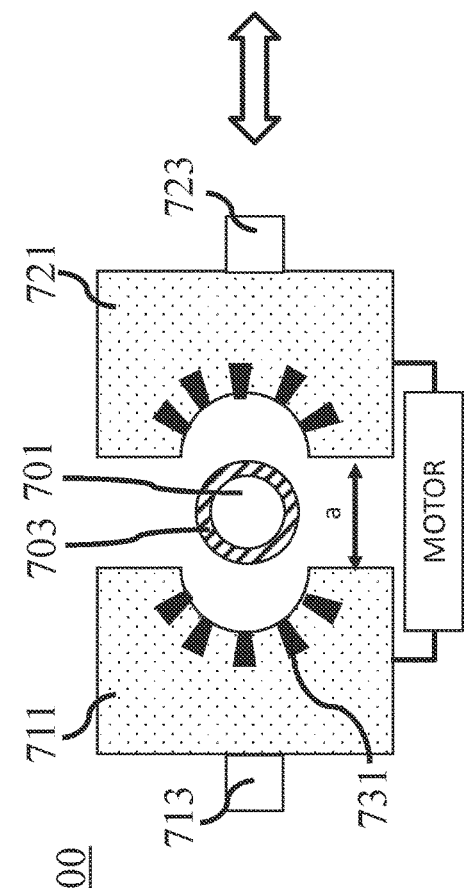
FIGS. 7A-7C illustrate schematics of a dynamic magnetic coupling system according to one embodiment of the present disclosure.
Figure 7B:
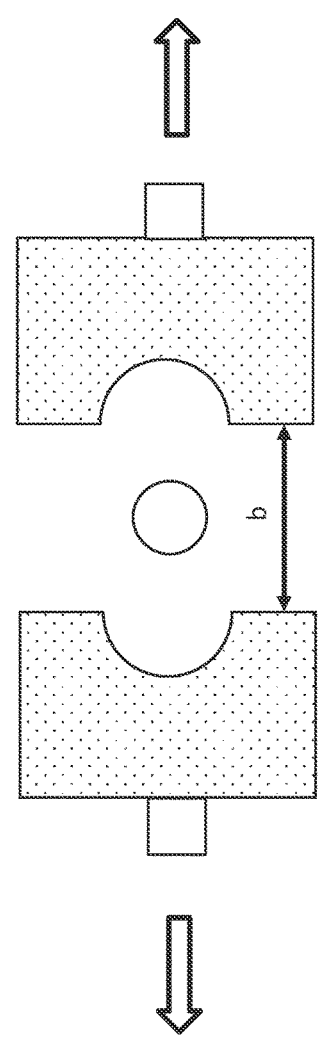
Figure 7C:
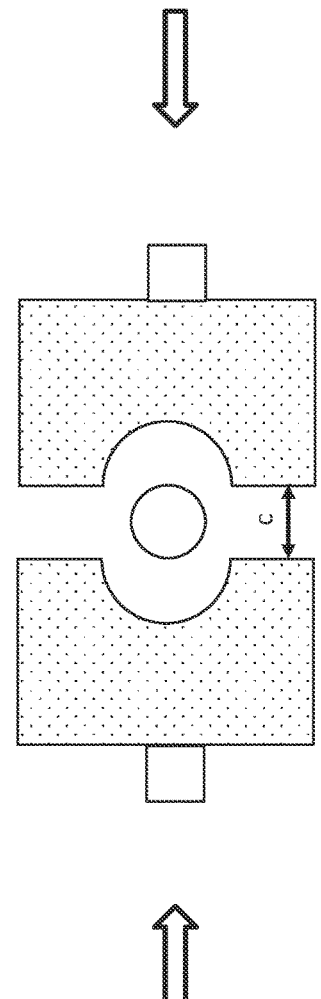

FIGS. 7A-7C illustrate schematics of a dynamic magnetic coupling system according to one embodiment of the present disclosure. For simplicity, the elements are only labelled in FIG. 7A and not expressly labelled in FIGS. 7B and 7C. The magnetic coupling system 700 is substantially similar to those described in prior figures herein (such as FIG. 4A), but includes at least two separate housing parts that are configured to move relative to the rotating shaft to vary the applied magnetic field.

FIG. 7A illustrates one embodiment of a dynamic magnetic coupling system 700. Dynamic magnetic coupling system 700 may comprise first part 711 coupled to second part 721. In one embodiment, linear actuator 713 is coupled to first part 711, while linear actuator 723 is coupled to second part 721. The actuators may be pneumatically or hydraulically operated. In some embodiments, linear actuators may not be needed and instead a stepper or servo motor may be used. Each of first housing part 711 and second housing part 713 comprises a plurality of magnets arranged at particular positions and configurations, such as that described in relation to FIGS. 4C and 5A. For example, first plurality of magnets 703 may be coupled to shaft 701 and rotate with shaft 701, while second plurality of magnets 731 may be located within both first part 711 and second part 721. Each of housing parts 711, 721 may have an inner surface that is contoured to match the profile of shaft 701, which allows any magnets positioned within the parts to be as close as possible to the rotating shaft. In one embodiment, instead of having the plurality of magnets 731, one or more coils may be positioned in parts 711 and 721 to induce a magnetic field based on applied current, as described herein. In one embodiment, two parts of the magnetic coupler are moved to vary the magnetic field, whereas in other embodiments only one part is moved.

In one embodiment a stepper motor or servo motor is coupled to each of the first and second parts 711, 721 to vary their positions relative to each other. In another embodiment, each of the actuators 713, 723 moves the attached magnetic housing part further away from and closer to the rotating shaft. The stepper/servo motor or actuator may move portions of the magnetic coupler radially or linearly. For example, FIG. 7A shows the magnetic coupling in a first position, where a distance between the two housing parts 711 and 713 is a distance "a." The housings parts are able to move apart as necessary (based on actuators or servo/stepper motors) to vary the magnetic field applied from the housing to the shaft. FIG. 7B shows a second position where the housing parts 711 and 713 are further apart at a distance "b." This position may be used when the applied magnetic field does not need to be as great (e.g., where instances of increased torque or power is not necessary). FIG. 7C shows a third position where the housing parts 711 and 713 are closer together at a distance "c." This position may be used when the applied magnetic field needs to be increased (e.g., where instances of increased torque or power is desired). The stepper/servo motor or linear actuators may be coupled to a control system to automatically vary the distance between the magnets of the magnetic coupler and the rotating shaft to vary the magnetic field.

Figure 8A:
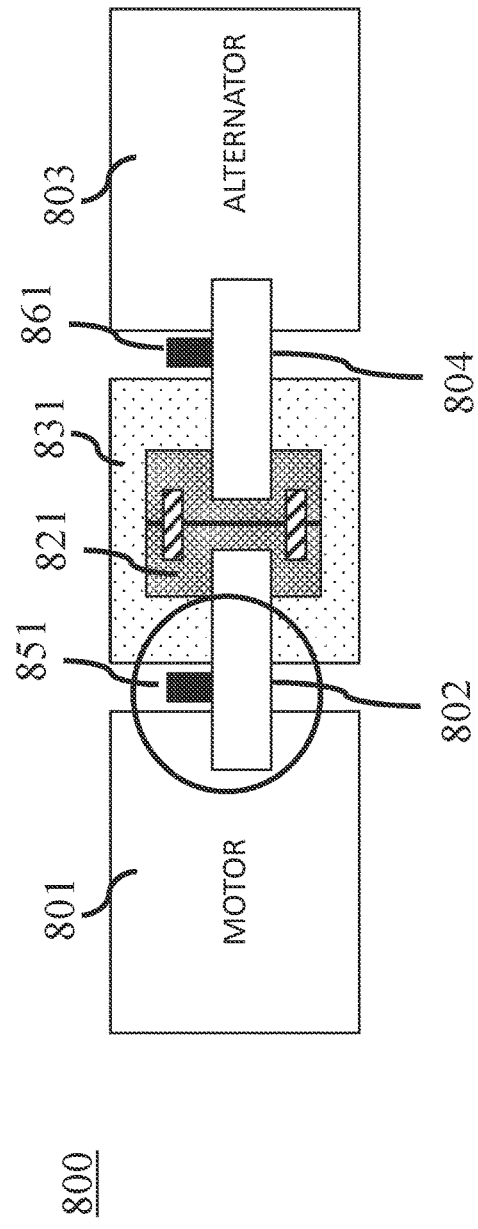
FIGS. 8A and 8B illustrate schematics of a braking system according to one embodiment of the present disclosure for a magnetic coupler.
Figure 8B:
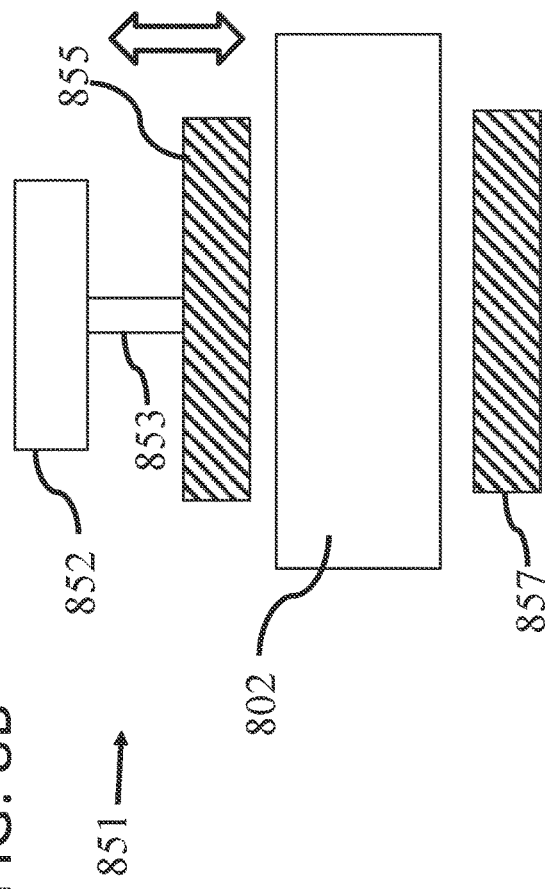

FIGS. 8A and 8B illustrate schematics of a braking system according to one embodiment of the present disclosure for a magnetic coupler. In particular, FIG. 8A shows a motor coupled to an alternator (or DC generator) with a magnetic coupler and braking system, while FIG. 8B shows an enlarged view of the braking system itself. Such a mechanical braking system may be necessary based on the use of the disclosed magnetic coupling system, which may provide a constant (albeit small) force that constantly causes the shafts to rotate even when the motor is turned off based on the static or passive magnetic fields from the permanent magnets. In other embodiments, the braking system may be used to maintain the frequency/rotation of the system when power is inputted to the system or when a load is particularly small or otherwise shocked.

FIG. 8A shows motor 801 coupled to alternator 803 via magnetic coupler 831. In one embodiment, magnetic coupler 831 may partially or substantially surround mechanical coupling device 821, as described in more detail above. In other embodiments, the magnetic coupling device 831 comprises the mechanical/spider coupling as an integral part of the magnetic coupling. Shaft 802 couples the motor to the magnetic coupler, while shaft 804 couples the magnetic coupler to the alternator. In one embodiment, braking system 851 is coupled to a portion of one or more of the shafts, such as shaft 802. In other embodiments, a second braking system 861 (which may or may not be coupled to the first braking system), may be coupled to another component of the overall system, such as shaft 804.

FIG. 8B shows an enlarged view (i.e., from the circled portion of FIG. 8A) of braking system 851 coupled to shaft 802. Braking system 851 may be coupled to a control system (not shown). Braking system 851 may comprise or be coupled to linear actuator 852 and/or plunger 853, which may be hydraulically or pneumatically actuated. One or more braking pads or devices 855, 857 may be coupled to the actuator and be configured to engage a portion of shaft 802. The braking devices may be substantially flat or rounded to better engage and/or couple with the shaft. In one embodiment, braking pad 855 and braking pad 857 form two parts of the same braking pad system and may be concentrically shaped around the shaft. In one embodiment, the disclosed braking system acts as a mechanical braking system. In one embodiment, when electricity is off to the system (such as when the electricity is turned off to the motor), the linear actuator 852/plunger 853 automatically returns to an extended state, thereby causing mechanical contact between braking pad 855 and shaft 802. Thus, even if an external (magnetic field) force acts on the shaft, the friction caused by the braking pad prevents or slows down rotation of the shaft. When electricity is powered to the system, linear actuator 853 is configured to retract, thereby positioning the braking pad away from the shaft and allowing the shaft to freely rotate. In one embodiment, the braking system is designed to create enough friction between the braking pad and the shaft to overcome any applied magnetic field when in a resting or off position of the overall system. In other embodiments, the braking system may be used to merely slow the system down to maintain a desired rotation instead of preventing rotation in its entirety.

Use/Operation

The versatility of the disclosed magnetic coupler allows it to be utilized in a wide variety of operations. For example, it can be used in industrial, commercial, and/or residential applications. It may be used to apply a continuous load as a standalone power station or may be used in electrical stations or systems to provide standby or enhanced power management capabilities, such as an EPS unit as described in the '632 patent. In one embodiment, it can be used as a coupler between any motor and alternator/generator to enhance the output of the system. Further, the magnetic coupler can be utilized in series for even greater torque amplification.

The present disclosure provides a method for coupling a first device to a second device, such as a motor and alternator, with a magnetic coupler. For example, one method may include providing a first device with a first shaft (such as a motor with an output shaft), providing a second device with a second shaft (such as an alternator or generator with an input shaft), and coupling the motor to the alternator by coupling the first shaft to the second shaft within a rotatable magnetic field. In one embodiment, a direct mechanical coupler may be used between the first and second shafts, which may provide a 1:1 rotation ratio of the shafts. The method may further include providing a magnetic coupler between the motor and the alternator, such as one that partially or substantially encloses the first or second shafts and/or the direct mechanical coupler. The magnetic coupler may include a housing with various levels of insulation materials, lubrication materials, and a plurality of permanent magnets arranged at specific locations within the coupler.

In one embodiment, the method may include generating a rotating magnetic field on the first or second shafts (or both) by the magnetic coupler. This may be a passive field (e.g., no electricity provided to the magnetic coupler) or an active field (e.g., electricity provided to one or more electric coils coupled within the magnetic coupler). The method may further include generating electrical current in the magnetic housing as well as varying the magnetic field by changing the electrical current applied to the magnetic housing. In some embodiments, portions of the magnetic coupler may be moved relative to each other and/or the rotating shafts to vary the applied magnetic field. For example, the method may comprise varying the magnetic field by changing the relative positions of one of more portions of the magnetic housing relative to the first or second shaft. The method may further include monitoring the magnetic field as well as the RPMs and torque of the shaft(s) and varying the magnetic field to produce the desired output result. Various control loops may be utilized.

In some embodiments, the use of a magnetic coupling device enhances the power (and/or torque) output by a factor of 2, while the use of two magnetic coupling devices in series may enhance the power (and/or torque) output by a factor of 4. Of course, the power amplification factor depends on the size, strength, and arrangement of the permanent magnets, as well as the input current to the extent the magnetic coupling device utilizes one or more coils to induce a magnetic field.

Figure 9:
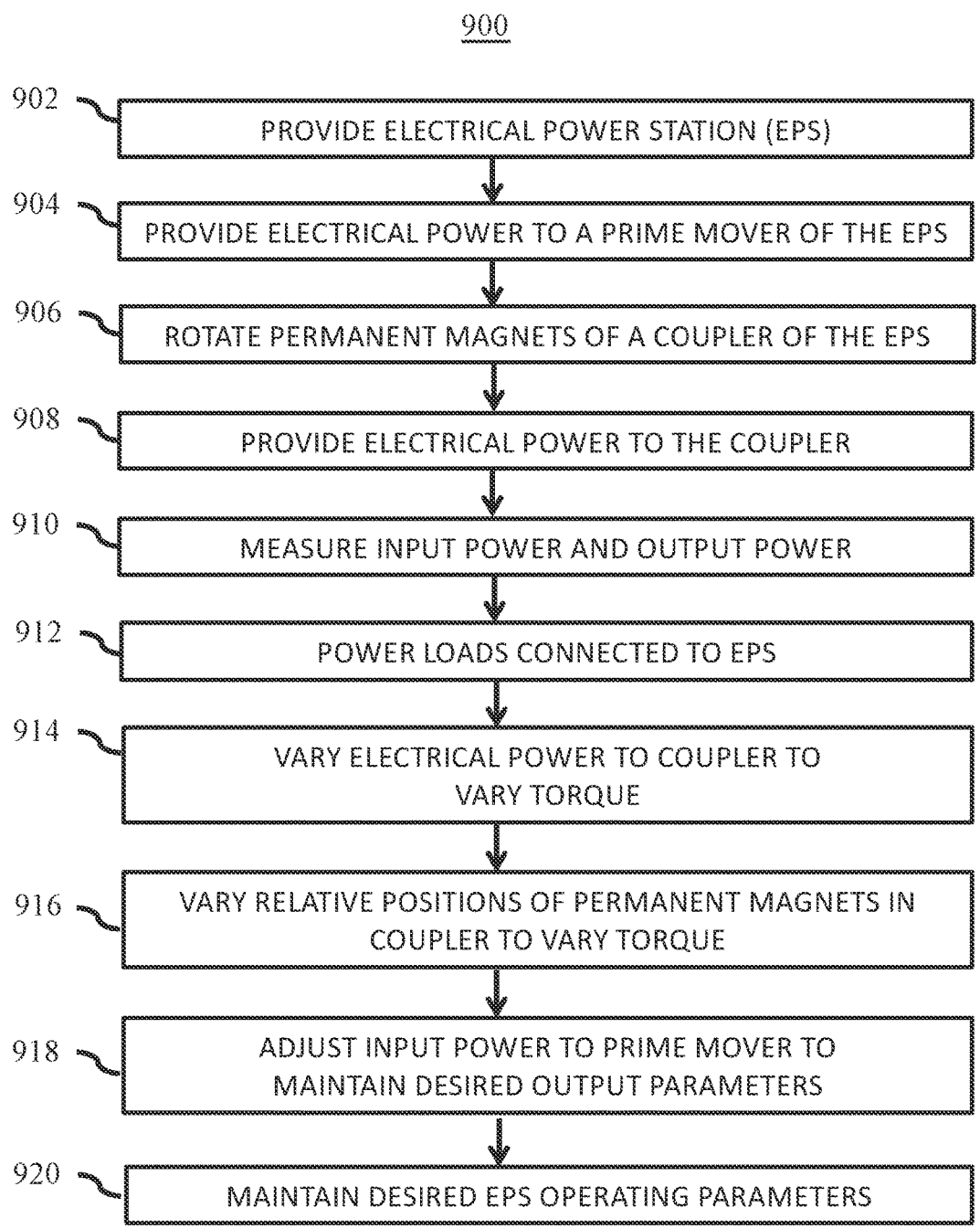
FIG. 9 illustrates one method of operating a magnetic coupling device according to one embodiment of the present disclosure.

FIG. 9 illustrates one method of operating a magnetic coupling device according to one embodiment of the present disclosure. In one embodiment, method 900 includes step 902 directed to providing and/or utilizing an electrical power station (EPS), as described herein. In one embodiment, the EPS may comprise a motor and alternator/generator coupled together by a magnetic coupling device as described herein. In one embodiment it may also include a battery system, a charging system, and a control system. In one embodiment, the EPS may be coupled to one or more electrical power input systems, such as a solar assembly, and may service one or more external loads. The EPS may be AC or DC or AC/DC based. In one embodiment, one or more of the motor, coupler, and alternator/generator may include permanent magnets and be a magnetically enhanced device as generally described herein. In other embodiments, an EPS is not provided and a magnetic coupling device is simply connected to an output shaft of a motor, with or without an alternator.

Step 904 comprises providing electrical power to a prime mover (motor) to get the system started. In one embodiment, current is provided to the motor, which rotates an output shaft of the motor, which through one or more direct or indirect couplings rotates an input shaft of an alternator/generator, which produces electrical power. In one embodiment various initialization steps may be performed for the EPS, system and/or motor to confirm that it is ready for operation.

Step 906 comprises rotating permanent magnets within the magnetic coupler. In one embodiment, permanent magnets are coupled to one or more rotatable shafts enclosed within and/or partially surrounded by the magnetic device coupling. In one embodiment, rotation of an output shaft of the motor rotates the shaft(s) of the magnetic coupling device, which therefore rotates the permanent magnets within the magnetic coupling device.

Step 908 is optional. If the magnetic coupling device comprises an induction coil to induce electrical current and a magnetic flux within the coupling deice (such as illustrated in FIG. 4B), the method may include step 908 of providing electrical power to the coupler. In one embodiment the applied current is kept at a substantially constant strength and is relatively low, such as between 0.1 to 1 amps. The applied current is strong enough to induce a magnetic field in the magnetic device to help rotate the permanent magnets attached to the enclosed rotatable shafts. As the current increases, the induced magnetic field increases. Likewise, as the rotational speed of the permanent magnets increases, the magnetic field increases. The applied magnetic field increases the torque/power output of the enclosed shafts. If the coupling device utilizes a second layer of permanent magnets (such as illustrated in FIG. 4C), then this step may be omitted because the magnetic field is created by the separate inner and outer magnetic fields created by the inner and outer permanent magnets.

In one embodiment, providing power to the motor affects the torque (and magnetic flux) provided to the coupler, and the power applied to the coupler affects the power necessary for the motor, and thus a dynamic loop is created between the power to the coupler and the motor that may require varying the power to each unit until the system reaches the desired operating levels and a continuous operate state. In one embodiment, if a magnetic coupler is utilized, it may take many seconds (such as 5-10 seconds) for the coupler to get "on-line" with the rotating and static magnetic fields of the coupler and to start helping the power output from the motor. In one embodiment, electrical power is provided to a prime mover at the same time that electrical power is provided to the coupler, while in other embodiments electrical power is provided to the prime mover and at a certain amount of time afterwards (such as between 1-10 seconds) electrical power is provided to the coupler.

Step 910 may include measuring the input power and/or output power of the system. This may be measured at the magnetic coupler and/or at an alternator/generator that is coupled to the magnetic coupler. If the output is not consistent and/or if it is not at the desired operating levels of the EPS for the intended load, the input power to various components may need to be adjusted to reach the desired operating level. At this point, no loads are directly connected and the system is effectively performing an initialization process to reach a stable operating state and/or a constant power output.

This step may also comprise measuring various system parameters based on sensors positioned throughout the system. For example, the input and output power to the system may be measured, and the input power to each device (motor, coupler, generator, charging system, batteries, etc.) may likewise be measured. Other parameters such as amperage, voltage, frequency (Hz), RPM, vibration, and temperature may be measured at each point within the EPS, and the charge of each battery and battery bank may be monitored continually. In one embodiment, the system parameters are continuously measured during the duration of operating the EPS unit. As is known in the art, a PLC unit may be integrally coupled to a plurality of sensors within the system for constant measuring capabilities. In one embodiment, the system continuously measures the input and output power of the system and the various system parameters.

Step 912 may comprise powering external loads connected to the magnetic coupler and/or EPS. If multiple loads are coupled, a load may be powered up one at a time, or multiple loads may be powered simultaneously. In one embodiment, a PLC is utilized with input terminals and output terminals to automatically power the connected loads. In one embodiment, external loads are not powered until the system reaches desired operating levels (e.g., at some point the initialization process ends and the normal operating mode turns on). Prior to powering loads a step may include maintaining a substantially stable and/or continuous output voltage, power, RPM, and/or frequency, which may be measured as the output from the generator and/or motor coupler. For example, in one embodiment a power output of 15 kva may be desired at a frequency of 60 Hz and a voltage of 220 V. The system runs for a certain amount of time until that desired output is reached and maintained for a predetermined amount of time. In one embodiment, the input and/or output of each of the magnetic motor, magnetic coupler(s), and magnetic generator affects each other, so the system may take some amount of time to reach stabilization. For example, as the output shaft from the motor turns, this increases the magnetic field applied by a magnetic coupler (which is coupled to the output shaft of the motor), which in turn amplifies the torque produced from the coupler and reduces the power necessary at the motor to produce the desired mechanical output. This is a dynamic process that may require variation of each of the electrical inputs to reach a substantially continuous and stable operating output. This step may include varying the input to the motor or the coupler to reach the desired output from the generator. In one embodiment, power is varied to the motor while the power provided to the coupler (if it is a magnetic coupler as described herein) is kept substantially constant. In one embodiment, it takes approximately 5-10 seconds for the system to reach a stabilized mode after being turned on. In other embodiments, it may take 30 seconds or more, such as 1 to 5 minutes.

Step 914 may comprise providing electrical power to the coupler to increase torque. Similar to step 908, this step is optional and may only be needed if the magnetic coupling device comprises an induction coil. Further, this step may not be necessary if the powered loads are relatively small and/or do not fluctuate significantly. For example, if the system is running at a substantially stable power output, and the load is small or consistent with the produced power output, then no additional current needs to be applied to the coupler. In other instances, based on various loads powered by the system, the system may need to increase the power to the coupler (e.g., increase the applied current) to create a larger magnetic field to thereby produce a higher torque from the magnetic coupler and the enclosed rotatable shafts. A higher torque produced from an output shaft of the coupler will create a higher electrical output to any coupled alternator/generator, and may be used for increased electrical production. In one embodiment, electrical power to the coupler can be varied as to whether its pulsating or continuous current, the duration and frequency of the pulsating current, and the strength of the current.

Step 916 may comprise varying positions of the permanent magnets within the magnetic coupler to vary the torque of the shafts within the magnetic coupler. In one embodiment, this step may be similar to those steps illustrated in FIGS. 7A-7C, and is optional based on the presence of the variably positioned permanent magnets. In one embodiment, the housing around the rotatable shafts may be moved closer or near to the permanent magnets coupled to the rotatable shafts. If the housing has a second plurality of permanent magnets, varying the relative positions of the first and second magnets changes the magnetic fields of the magnetic coupling device and thereby various the torque based on the distance between the permanent magnets. If the housing has one or more coils for using electrical current to induce a magnetic field, then varying the position of that external magnetic field to the rotatable magnets similarly changes the magnetic fields of the magnetic coupling device and thereby varies the applied torque. In one embodiment, a stepper motor or servo motor may be used, while in other embodiments a plurality of linear actuators may be used to vary the portions of the stator housing. In one embodiment, this step may be considered as or equated to varying the magnetic field(s) within the magnetic coupling device.

Step 918 may comprise adjusting the input electrical power to the prime mover (motor) to maintain the present output parameters. Based on particular load demands increased power may need to be provided to the motor/prime mover as well as the coupler. In one embodiment (particularly with a large load), to keep the RPM constant at the output the electrical power provided to the motor needs to be increased or decreased, depending on the load demands. Likewise, to produce more torque the RPM may need to be increased at the motor for the system. In one embodiment, continuous current at a constant voltage may be supplied to the motor, while in other embodiments continuous current at varying voltages may be supplied to the motor. In some embodiments, pulsating current at a constant voltage may be supplied to the motor, while in other embodiments pulsating current with varying voltages may be supplied to the motor. In other words, if only a given amount of power is needed to maintain the desired output power parameters, then only the minimally necessary power is provided to the motor to provide that power. In one embodiment, power is provided to the motor without providing additional power to the coupler. In other words, power may be provided to the coupler at a substantially constant rate and only the input power to the motor may be varied for the loads. In other embodiments, power may be varied both to the magnetic coupler and the motor as necessary. As mentioned above, because the motor output affects the magnetic coupler (and vice versa), changing the power input to either of the motor or magnetic coupler is a dynamic process that constantly affects the produced output.

Step 920 may comprise maintaining the desired EPS operating parameters, which may include voltage, RPM, and/or frequency, which may be measured at the magnetic coupler or another component within the overall system, such as the generator/alternator. In other embodiments, it may include any of the overall system parameters, including battery charge. In one embodiment, this step may comprise adjusting the input electrical power to the prime mover to maintain the present output parameters. In other embodiments, input power may be adjusted to the magnetic coupler to vary the torque produced from the coupler. In other embodiments, the magnetic fields of the magnetic coupler may be actively varied (such as by moving the relative positions of the magnets) to increase or decrease the output.

In one embodiment, the output from the system is greater than the input to the system based on the magnetic fields applied by the magnetic coupler.

Figure 10:
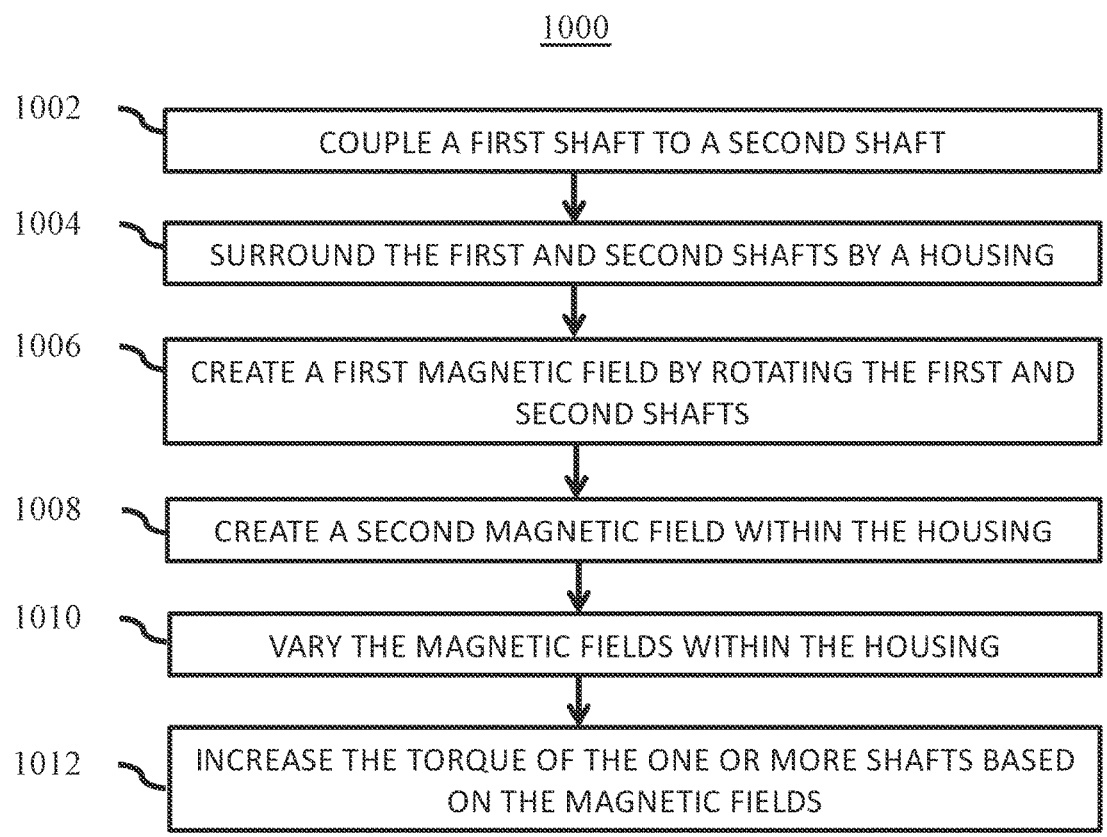
FIG. 10 illustrates one method of operating a magnetic coupling device according to one embodiment of the present disclosure.

FIG. 10 illustrates one method of operating a magnetic coupling device according to one embodiment of the present disclosure. In one embodiment, it may be substantially similar to the steps described in relation to FIG. 9. In one embodiment, method 1000 may include coupling a motor to an alternator/generator, which may include providing and/or utilizing an electrical power station (EPS), as described herein. In other embodiments, an EPS is not provided and a magnetic coupling device is simply connected to an output shaft of a motor, with or without an alternator.

Step 1002 may comprise coupling a first shaft to a second shaft. The first shaft may be an output shaft of a motor and the second shaft may be an input shaft to a generator. In other embodiments, if there are a plurality of magnetic device couplings in series, the first shaft may be the output shaft from a first magnetic coupling device, or the output shaft may be the input shaft to a second magnetic coupling device. In one embodiment, the coupling step is a direct, physical coupling, which may include attaching flanges and/or otherwise physically securing the first shaft to the second shaft such that rotation of the first shaft causes rotation of the second shaft. In one embodiment this may be a traditional spider coupling.

Step 1004 comprises surrounding the first and second shafts by a housing to create a magnetic coupling device as described herein. The housing may be cylindrical around the shafts or may be rectangularly shaped. The housing may be considered a stator and the rotatable shafts may be considered a rotor. The housing may have multiple parts and may partially surround the first shaft and the second shaft on all radial sides of the shaft, such that the shafts extend out from the housing on either end of the housing. In one embodiment, steps 1002 and 1004 may be omitted and a magnetic coupling device with enclosed rotatable shafts may be provided and/or utilized.

Step 1006 comprises creating a first magnetic field within the housing by rotating the first and second shafts. In one embodiment, a first plurality of permanent magnets are coupled to either or both of the first and second shafts. In one embodiment, the shafts are rotated by coupling the shaft to a motor that is energized, which thereby rotates the shafts. Step 1008 comprises creating a second magnetic field within the housing, which may be within a stator portion of the housing. If the housing has one or more electric coils, the second magnetic field may be created by applying current to the induced coils. If the housing has a second plurality of magnets, the second magnetic field is a static or permanent magnetic field. In one embodiment, the magnetic fields are a static magnetic field (stator) and a rotating magnetic field (rotor), that interact together to increase the applied torque to the rotatable shafts. Step 1010 comprises varying the magnetic fields within the housing. This may include varying the rotation speed of the rotatable shafts, varying the applied current to the electric coils, or varying the positions of the stator/housing to the first plurality of permanent magnets coupled to the rotor. Step 1012 comprises increasing the torque of the shafts based on the rotating and static magnetic fields. In some embodiments, a single magnetic coupling device can increase the applied torque/power of the shafts by at least two or three times. Of course, the increased torque factor is based on the rotation of the shafts and the size, strength, and configuration of the permanent magnets positioned on the shafts and/or the stator/housing.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the configurations of the mechanical coupling, permanent magnets, and coupled devices are within the scope of the invention. For example, the disclosed magnetic coupler may be coupled to any first and/or second devices, and is not limited to motors or alternators/generators. Likewise, it may be part of a modular system that pairs a plurality of magnetic couplers in series for enhanced effects. Parts of the magnetic coupler may or may not rotate relative to an external (or enclosed/surrounded) shaft. It may be part of an electric power station or a stand-alone system that couples a first device to a second device. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A magnetic coupling device, comprising:
   a first rotatable shaft coupled to a second rotatable shaft by a spider coupling, wherein the first rotatable shaft is coupled to a motor and the second rotatable shaft is coupled to a generator;
   a housing that is configured to surround the first and second rotatable shafts; and
   a first plurality of permanent magnets coupled to at least one of the first rotatable shaft and the second rotatable shaft within the housing, wherein the first plurality of permanent magnets is configured to create a rotating magnetic field within the housing;
   a second plurality of permanent magnets at least partially surrounding the first plurality of permanent magnets, wherein the second plurality of permanent magnets is located radially outward of the first plurality of magnets,
   wherein the first plurality of magnets is configured to rotate and the second plurality of magnets is configured to remain substantially fixed,
   wherein the magnetic coupling device is configured to increase an axial torque on the second rotatable shaft based on rotation of the first plurality of permanent magnets.

2. The device of claim 1, wherein the first plurality of permanent magnets is coupled to both the first rotatable shaft and the second rotatable shaft.

3. The device of claim 1, further comprising one or more induction coils within the housing that is configured to increase a magnetic field of the first plurality of permanent magnets when electrically charged.

4. The device of claim 1, wherein the first plurality of magnets is located in a plurality of grooves within a cylindrical ring around the first or second rotatable shafts.

5. The device of claim 1, wherein the first plurality of magnets is coupled to the first or second rotatable shafts by a cylindrical ring.

6. The device of claim 1, wherein the first plurality of magnets is arranged concentrically around the first rotatable shaft and the second rotatable shaft.

7. The device of claim 1, wherein each of the first plurality of magnets is positioned concentrically within the housing at a first radial position.

8. The device of claim 1, wherein the first plurality of magnets is arranged concentrically around the first and second rotatable shafts in alternating strengths.

9. The device of claim 1, wherein the first plurality of permanent magnets comprises at least two different strengths of magnets.

10. The device of claim 1, wherein the magnetic coupling device comprises a rotor and a stator, wherein a magnetic flux of the magnetic coupling device comprises the sum of the induced magnetic field from the stator and the rotating magnetic field from the rotor.

11. A method of providing electrical energy, comprising:
    coupling an electric motor to a generator with a magnetic coupling device, wherein the magnetic coupling device comprises a housing with a plurality of permanent magnets, wherein the plurality of permanent magnets comprises a first plurality of magnets and a second plurality of magnets, wherein the second plurality of magnets at least partially surrounds the first plurality of magnets, wherein the first plurality of magnets is configured to rotate and the second plurality of magnets is configured to remain substantially fixed,
    energizing the electric motor;
    creating a rotating magnetic field by the magnetic coupling device;
    increasing an axial torque produced by the motor based on the rotating magnetic field; and
    providing electrical current to the magnetic coupling device to increase the magnetic flux of the rotating magnetic field.

12. The method of claim 11, further comprising rotating the plurality of magnets by applying current to the magnetic coupling device.

13. The method of claim 11, further comprising rotating the plurality of magnets by induction of a magnetic field.

14. The method of claim 11, further comprising varying a magnetic field in the magnetic coupling device by varying an electrical current provided to the magnetic coupling device.

15. The method of claim 11, further comprising inducing a magnetic field in the magnetic coupling device by rotating a first plurality of magnets within a second plurality of magnets within the magnetic coupling device.

\* \* \* \* \*